US012230142B2

(12) United States Patent
Butara et al.

(10) Patent No.: US 12,230,142 B2
(45) Date of Patent: Feb. 18, 2025

(54) STATUS REPORTING SYSTEM FOR AIRCRAFT

(71) Applicant: AVIATION CAPITAL PARTNERS, LLC, Mayfield Heights, OH (US)

(72) Inventors: Neil Butara, Mayfield Heights, OH (US); Scott Beale, Mayfield Heights, OH (US); Lance Warren, Mayfield Heights, OH (US)

(73) Assignee: AVIATION CAPITAL PARTNERS, LLC, Mayfield Heights, OH (US)

( * ) Notice: Subject to any disclaimer, the term of this patent is extended or adjusted under 35 U.S.C. 154(b) by 0 days.

(21) Appl. No.: 18/141,752

(22) Filed: May 1, 2023

(65) Prior Publication Data

US 2023/0326353 A1 Oct. 12, 2023

Related U.S. Application Data

(63) Continuation-in-part of application No. 17/683,992, filed on Mar. 1, 2022.

(51) Int. Cl.
*G08G 5/00* (2006.01)

(52) U.S. Cl.
CPC .................................. *G08G 5/0004* (2013.01)

(58) Field of Classification Search
CPC ..... G08G 5/0004; G08G 5/003; G08G 5/0047
See application file for complete search history.

(56) References Cited

U.S. PATENT DOCUMENTS 4,827,419 A * 5/1989 Selby, III ............... G01C 21/20
701/532
5,374,932 A * 12/1994 Wyschogrod ........... G01S 13/91
342/39

(Continued)

FOREIGN PATENT DOCUMENTS

CN 101395628 A * 3/2009 ........... G06Q 10/047
CN 109689503 A * 4/2019 ............. B64D 43/00

(Continued)

OTHER PUBLICATIONS

"At the crossroads in air-traffic control I. The view from the ground—the congested airports; the Common IFR Room; present and future automated systems; plans of the FAA; problems of the air-traffic controllers;" Friedlander et al., IEEE Spectrum (vol. 7, Issue: 6, pp. 26-40), Jun. 1, 1970. (Year: 1970).*

(Continued)

*Primary Examiner* — Khoi H Tran
*Assistant Examiner* — Jorge O Peche
(74) *Attorney, Agent, or Firm* — Calfee, Halter & Griswold LLP

(57) ABSTRACT

An aircraft analysis application retrieves transponder data that is output by a transponder mounted on an aircraft. The transponder data is indicative of locations of the aircraft over a period of time. The aircraft analysis application maps the locations of the aircraft indicated by the transponder to a jurisdictional map identifying boundaries of a plurality of jurisdictions. The aircraft analysis application computes a fractional portion of time spent by the aircraft in a first jurisdiction in the plurality of jurisdictions based upon the locations of the aircraft indicated by the transponder and the jurisdictional map. The aircraft analysis application generates a jurisdictional status report that comprises a graphical indication of the fractional portion of time spent by the aircraft in the first jurisdiction.

30 Claims, 13 Drawing Sheets

(56) References Cited

U.S. PATENT DOCUMENTS 5,424,746 A * 6/1995 Schwab .................. G01S 5/021 342/463
5,519,618 A * 5/1996 Kastner .................. G08G 5/065 701/120
5,574,648 A * 11/1996 Pilley ..................... G01C 23/00 342/36
6,278,913 B1 * 8/2001 Jiang .................... G07C 5/0858 701/25
6,433,729 B1 * 8/2002 Staggs ...................... G01S 7/12 342/36
6,563,453 B1 * 5/2003 Wilson .................. G01S 13/782 342/29
7,612,716 B2 * 11/2009 Smith .................. G08G 5/0082 342/454
7,786,899 B2 8/2010 Baker et al.
7,825,858 B2 11/2010 Blessing et al.
7,907,067 B2 3/2011 Baker et al.
8,160,759 B2 4/2012 Baker et al.
8,165,809 B1 4/2012 Baker et al.
8,214,144 B2 7/2012 Baker et al.
8,217,807 B1 * 7/2012 Carrico ................ G08G 5/0047 340/964
8,296,281 B2 10/2012 Baker et al.
8,330,625 B2 * 12/2012 McCullough .......... G08G 5/003 340/979
8,332,136 B2 12/2012 Baker et al.
8,606,508 B2 12/2013 Baker et al.
8,615,418 B1 * 12/2013 Niznik ................... G06Q 10/02 701/120
8,688,496 B1 * 4/2014 Tansupaswatdikul ...................... G06Q 10/08 705/5
8,731,990 B1 * 5/2014 Osborne ................ G06Q 10/08 701/120
8,755,992 B2 6/2014 Baker et al.
8,874,458 B1 * 10/2014 Ande ..................... G06Q 10/02 701/120
8,958,931 B2 2/2015 Baker et al.
8,963,776 B2 2/2015 Baker et al.
9,530,323 B1 * 12/2016 Maji .................... G08G 5/0008
9,779,357 B1 * 10/2017 Dabell ................. G08G 1/0137
9,849,044 B1 * 12/2017 Groden .................. G06Q 50/22
10,102,755 B1 * 10/2018 Hamilton ............. G08G 5/0013
10,297,160 B1 * 5/2019 O'Leary ................ B64D 45/00
10,354,536 B1 * 7/2019 Hegranes .............. B64C 39/024
10,360,084 B1 7/2019 Hawkins et al.
10,490,086 B1 11/2019 Baker et al.
10,956,988 B2 * 3/2021 Beale ................... G06Q 40/123
11,537,146 B2 * 12/2022 Hayes ................ G01C 21/3605
11,816,998 B2 * 11/2023 X ........................... G07C 5/008
2002/0075171 A1 * 6/2002 Kuntman ............. G08G 5/0078 340/961
2002/0091756 A1 * 7/2002 Goodwin ............ G06F 11/1446 707/999.202
2002/0140733 A1 * 10/2002 Edlund ................ G06Q 10/109 715/764
2003/0201365 A1 * 10/2003 Nelson ............... B64D 45/0034 244/118.5
2004/0260777 A1 * 12/2004 Kolb ......................... H04L 9/40 709/206
2005/0182557 A1 * 8/2005 Smith .................... G06Q 10/10 701/120
2006/0119515 A1 * 6/2006 E. Smith ............... G01S 13/933 342/450
2006/0259216 A1 * 11/2006 Roberts .................. G01C 25/00 701/8
2007/0200761 A1 * 8/2007 Smith ..................... G01S 13/86 342/461
2008/0039997 A1 * 2/2008 Kolb ...................... G07C 5/085 701/33.4
2008/0106455 A1 * 5/2008 Ino ........................ G01S 13/781 342/32
2008/0158041 A1 * 7/2008 Crudeli ................... G01S 17/88 703/22
2010/0194602 A1 * 8/2010 Engels ................... G08G 5/045 340/979
2011/0055172 A1 * 3/2011 Tan ................... G06F 16/24568 707/769
2011/0144897 A1 * 6/2011 Dunsky .................... G08G 5/00 701/122
2012/0072249 A1 * 3/2012 Weir ...................... G06Q 10/00 705/5
2012/0191273 A1 * 7/2012 Jacobs ............... B64D 45/0059 701/3
2013/0147652 A1 * 6/2013 Haque .................. G08G 5/0013 342/21
2014/0099986 A1 * 4/2014 Kikuchi .................. H04W 4/08 455/518
2014/0210648 A1 * 7/2014 Samuthirapandian ....................... G08G 5/0021 340/961
2014/0297169 A1 * 10/2014 Le ........................ G08G 5/0021 701/121
2015/0058183 A1 2/2015 Clark
2015/0058184 A1 * 2/2015 Clark ..................... G06Q 50/26 705/30
2015/0225075 A1 * 8/2015 Renier .................. B64C 25/405 244/50
2015/0363886 A1 * 12/2015 Fernandes ................ G07C 5/00 705/4
2016/0055175 A1 * 2/2016 Thompson ......... G08B 21/0269 707/722
2016/0101855 A1 * 4/2016 Stefani ................. G05D 1/0016 701/2
2016/0155342 A1 * 6/2016 Gibson ................ G08G 5/0082 701/409
2016/0328981 A1 * 11/2016 Herder ................. G08G 5/0008
2017/0011637 A1 1/2017 Woicekowski et al.
2017/0106997 A1 * 4/2017 Bekanich ............... G08B 25/10
2017/0123382 A1 * 5/2017 Ruzicka ................. G04R 20/00
2017/0248701 A1 * 8/2017 Adler ..................... B64D 45/00
2017/0276507 A1 * 9/2017 Zacharenko .......... G06T 11/206
2017/0293307 A1 * 10/2017 Frolov .................... B64C 13/16
2017/0358212 A1 * 12/2017 Godwin ............... G08G 5/0039
2018/0374161 A1 * 12/2018 Beale ................... G06Q 40/123
2019/0033862 A1 * 1/2019 Groden ................ G05D 1/0088
2019/0041233 A1 * 2/2019 Duerksen ............. G08G 5/0034
2019/0102407 A1 * 4/2019 Young ................. G06F 3/04815
2019/0189017 A1 * 6/2019 Nicholls .............. G08G 5/0008
2019/0311633 A1 * 10/2019 O'Leary ................ G01C 23/00
2020/0043347 A1 * 2/2020 Wartofsky ........... G08G 5/0082
2020/0116492 A1 * 4/2020 Scott ....................... G06F 16/29
2020/0193841 A1 * 6/2020 D'Alto ................. G08G 5/0026
2020/0249697 A1 * 8/2020 Hayes .................. G05D 1/0291
2020/0311149 A1 * 10/2020 Karmelich ........... G08G 5/0095
2021/0134162 A1 * 5/2021 Sundaramurthy ..... B64U 20/80
2022/0013016 A1 * 1/2022 Gallagher ............... H04W 8/02
2022/0238029 A1 * 7/2022 Li ........................ G08G 5/0069
2022/0309934 A1 * 9/2022 Panchangam ........ G08G 5/0052
2022/0335841 A1 * 10/2022 Huncha ................ G08G 5/0034
2022/0335842 A1 * 10/2022 Thiyagarajan ....... G08G 5/0026
2022/0404840 A1 * 12/2022 Stenneth .............. G08G 5/0052
2023/0281726 A1 * 9/2023 Butara ................. G08G 5/0082 701/521
2023/0316935 A1 * 10/2023 Hammersla, III ..... G08G 5/006 701/122
2023/0326353 A1 * 10/2023 Butara ................. G08G 5/0004 701/120

FOREIGN PATENT DOCUMENTS

CN 112748456 A * 5/2021 ............. B64C 39/02
CN 112749007 A * 5/2021 ............. B64C 39/02
CN 113257041 A * 8/2021 ........... B64C 39/024
CN 111640333 B * 3/2022 ............. G08G 5/003
CN 113326259 B * 8/2024 ......... G06F 16/2282
DE 69922704 T2 * 12/2005 ............. B60Q 1/525
EP 2511658 A1 * 10/2012 ............. G01C 15/00
JP H0896300 A * 4/1996

(56) References Cited

FOREIGN PATENT DOCUMENTS

| | | | | | |
|---|---|---|---|---|---|
| JP | 2004038802 | A | * | 2/2004 | |
| JP | 2017126227 | A | * | 7/2017 | |
| KR | 100296760 | B1 | * | 10/2001 | |
| KR | 20160126342 | A | * | 11/2016 | |
| WO | WO-0201755 | A1 | * | 1/2002 | ......... H04B 7/18504 |
| WO | WO-2004045106 | A1 | * | 5/2004 | ............. G07C 5/008 |
| WO | WO-2013151554 | A1 | * | 10/2013 | ......... G01S 13/9303 |
| WO | WO-2020016962 | A1 | * | 1/2020 | ........... G06F 16/909 |

OTHER PUBLICATIONS

"OpenSky report 2017: Mode S and ADS-B usage of military and other state aircraft;" Schafer et al., 2017 IEEE/AIAA 36th Digital Avionics Systems Conference (DASC) (pp. 1-10); Sep. 1, 2017. (Year: 2017).*

"Integrating flight-related information into a (Big) data lake;" Martinez-Prieto et al., 2017 IEEE/AIAA 36th Digital Avionics Systems Conference (DASC) (pp. 1-10); Sep. 1, 2017. (Year: 2017).*

"Future E-Enabled Aircraft Communications and Security: The Next 20 Years and Beyond;" Sampigethaya et al., Proceedings of the IEEE (vol. 99, Issue: 11, pp. 2040-2055); Nov. 7, 2011. (Year: 2011).*

FlightAware, "FlightAware Custom Reports" <https://www.flightaware.com/commercial/customreports/> (<https://web.archive.org/ web/20210217040659/https://www.flightaware.com/commercial/customreports/> captured on Feb. 17, 2021 using the Wayback Machine) (Year: 2021).

* cited by examiner

400

500

| REG. NUM (502) | CALL SIGN (504) | DEPART. LOCATION (506) | ARRIVAL LOCATION (508) | ARRIVAL DATE (510) | DEPART. DATE (512) | STAY (514) |
|---|---|---|---|---|---|---|
| 522 N714XR | N/A | PIT | ROA | Apr 3 | Apr 5 | 3 |
| 524 N714XR | N/A | ROA | ZZV | Apr 5 | Apr 6 | 2 |
| 526 N714XR | N/A | PKB | ROA | Apr 11 | Apr 12 | 2 |
| 528 N662CT | ABC123 | PIT | ROA | Apr 8 | Apr 8 | 1 |

FIG. 5

STATUS REPORTING SYSTEM FOR AIRCRAFT

RELATED APPLICATIONS

This application is a Continuation in Part of and claims the benefit of prior non-provisional patent application Ser. No. 17/683,992, filed Mar. 1, 2022, the priority of which is hereby claimed and the disclosure of which is incorporated herein by reference in its entirety.

The present disclosure relates generally to computer-implemented technologies for monitoring an aircraft, and more specifically, pertains to computer-implemented technologies for computing location and other status information for the aircraft.

BACKGROUND

Transportation continues to be vital in our daily lives. People and goods often travel using commercial vehicles such as aircraft, boats, trains, and motor vehicles. While airlines carry a majority of air passengers, a considerable number of passengers travel via general aviation aircraft such as business jets. Recent reports have indicated that general aviation adds up to 1.1 million jobs and contributes over $200 billion to the U.S. economy. General aviation enables businesses to enable face-to-face contacts which can be vital for certain businesses. In addition to business travel, general aviation can provide other vital services, such as emergency medical flights, aerial firefighting flights, law enforcement flights, flight training, time-sensitive cargo flights, aerial photography/surveillance, personal travel, as well as agricultural functions.

Recent reports indicate that there are about 15,000 business aircraft registered in the United States. A "Business aircraft" is defined as fixed-wing turbine aircraft plus piston (single and twin engine) general aviation aircraft and flown as business or corporate operations as determined by the Federal Aviation Administration (FAA). About 3 percent of these aircraft are flown by Fortune 500 companies, while the remaining 97 percent encompass a broad cross-section of operators that are primarily businesses of all sizes. Business aircraft operators are registered in every state in the country.

Conventional computing systems are unable to accurately track an aircraft's movement due to the disparate nature of aviation data. For example, certain data is captured directly from a transponder located on the aircraft, while other data is recorded at airports as aircraft arrive and depart. Retrieving certain aviation data is further complicated by jurisdictional boundaries that may result in data being collected and stored in multiple places where access may be restricted. Additionally, the scattered nature of the data requires a computing system to associate each source of data with a corresponding aircraft. Accordingly, constructing an accurate and complete picture of movement of an aircraft over time is difficult or impossible using conventional systems. For organizations tasked with auditing the movement of aircraft, conventional computing systems fail to provide an accurate and holistic view of the flight path of the aircraft as it traveled throughout multiple jurisdictional areas. Specifically, conventional systems are not configured to communicate with the disparate data systems, and therefore are prone to significant gaps in information relating to the movement of an aircraft. The incomplete information results in the inability of conventional systems to recognize and account for gaps in flight data when analyzing the movement of an aircraft.

SUMMARY

Disclosed aspects provide an aircraft analysis system that is developed for aircraft including private, business and commercial assets with particular attention towards private/business aircraft. In an example, a computing system obtains data from a plurality of aviation information databases to compute location and status information of an aircraft over time. The system has a processor and a memory storing an aircraft analysis application, that, when executed by the processor, causes the computing system to perform certain acts. For example, when executed by the processor, the aviation analysis application retrieves transponder data related to an aircraft. The transponder data may be data output by an automatic dependent surveillance—broadcast (ADS-B) transponder mounted on an aircraft. The transponder data is indicative of geographic location information of the aircraft over a period of time. The transponder data, for example, may also comprise altitude data, speed data, along with other aviation parameters, including aircraft type, make, model, an aircraft ID (e.g., call sign or tail number), or other aviation parameters.

The aircraft analysis application analyzes the transponder data and maps locations of the aircraft indicated by the transponder data to a jurisdictional map. The jurisdictional map identifies predefined geographic boundaries. Each jurisdiction in the jurisdictional map is representative of a physical area defined by boundaries of the jurisdiction. Certain boundaries may be represented by lines of longitude and latitude corresponding to the boundaries of a jurisdiction (e.g., boundaries between states). The aircraft analysis application then computes a time metric indicative of the fractional portion of time spent by the aircraft in one or more jurisdictions based upon the transponder data and the jurisdictional map. The aircraft analysis application then generates a jurisdictional status report that comprises an indication of the fractional portion of time spent by the aircraft in one or more jurisdictions.

The jurisdictional status report may further comprise graphical indicia of a flight path of the aircraft based upon the location of the aircraft over a period of time. The graphical indicia may be overlaid on an image depicting one or more jurisdictions, thereby illustrating an approximate flight path of the aircraft. In an example, the graphical indicia are displayed at a display associated with the computing system. The aircraft analysis application may further compute the estimated flight path of the aircraft based upon the locations of the aircraft indicated by the transponder data.

The aircraft analysis application may further determine a departure airport and an arrival airport for a flight of the aircraft based upon the locations of the aircraft indicated by the transponder data and an airport map indicative of locations of airports. The aircraft analysis application may further receive flight data indicative of a plurality of flights flown by the aircraft during a period of time. The flight data may be stored on disparate databases. The aircraft analysis application may then generate a flight table having a plurality of entries based upon the flight data and the plurality of locations indicated by the transponder data. Each of the entries in the flight table is representative of a respective flight flown by the aircraft.

The aircraft analysis application may also generate a merged flight table by merging the transponder data with the flight table. Each of the entries of the merged flight table comprises locations of the aircraft during the flight represented by that entry. Generating the merged flight table comprises determining, based upon the location indicated by the transponder data, that the aircraft landed at a first airport at a first time, determining that a first entry in the flight table is indicative of a first flight for which the aircraft landed at the first airport at the first time, and responsive to determining that the first entry is indicative of the first flight for which the aircraft landed at the first airport at the first time, merging a first portion of the transponder data into the first entry, wherein the first portion of the transponder data comprises locations of the aircraft during the first flight represented by the first entry. Generating the merged flight table may further comprise determining, based upon times associated with the locations indicated by the transponder data, that the locations indicated by the transponder data are locations of the aircraft during a first flight of the aircraft, and responsive to determining that the locations indicated by the transponder data are location of the aircraft during the first flight of the aircraft, updating a first entry in the flight table that is representative of the first flight of the aircraft to include the locations indicated by the transponder data.

The computer-implemented technologies described herein are an improvement over conventional computer-implemented technologies with respect to computing locations of aircrafts; specifically, the computer-implemented technologies described herein are configured to obtain aircraft flight data from numerous data sources, identify gaps in the aircraft flight data, and populate such gaps with computed and/or inferred aircraft flight information. Moreover, due to the ability to create accurate flight data, the computer-implemented technologies described herein are able to accurately compute jurisdictions that the aircraft was in over time windows, regardless of whether the aircraft is in flight or grounded. The technologies described herein are particularly well-suited for security scenarios, as the computing system can ensure that locations over time reported by an aircraft operator represent the actual locations over the aircraft over time.

BRIEF DESCRIPTION OF THE DRAWINGS

The structure, operation, and advantages of the present disclosure will become further apparent upon consideration of the following description taken in conjunction with the accompanying figures (FIGS.). The figures are intended to be illustrative, not limiting.

Certain elements in some of the figures can be omitted, or illustrated not-to-scale, for illustrative clarity. The cross-sectional views can be in the form of "slices", or "near-sighted" cross-sectional views, omitting certain background lines which would otherwise be visible in a "true" cross-sectional view, for illustrative clarity. Furthermore, for clarity, some reference numbers can be omitted in certain drawings.

FIG. 5 illustrates an example of traffic control system data for generating a status report in accordance with the various technologies described herein.

DETAILED DESCRIPTION

Figure 1:
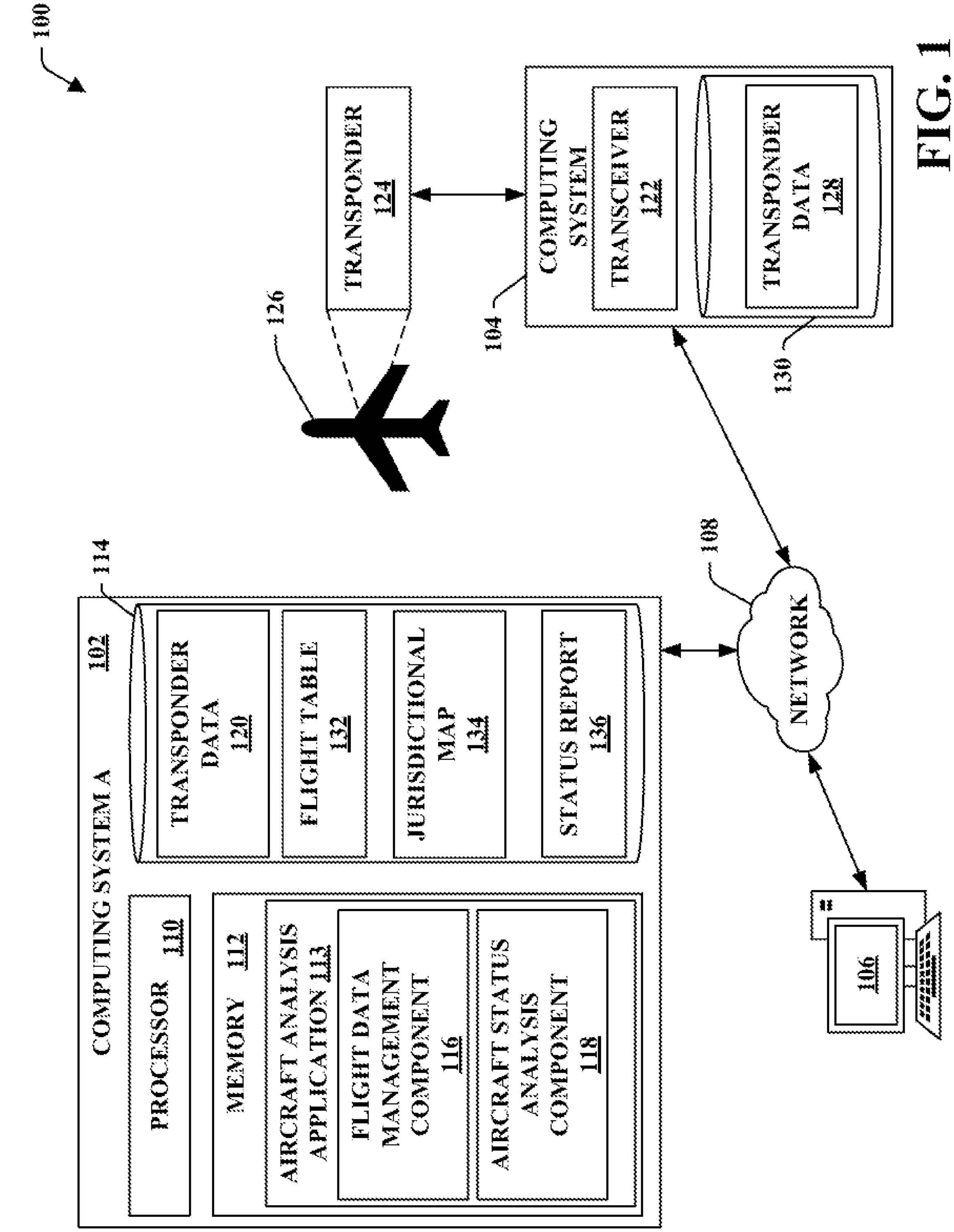
FIG. 1 illustrates an example aircraft analysis system that includes a computing system that is in network communication with several data sources.

The present disclosure will now be described with reference to the attached drawing figures, wherein like (or similarly ending) reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), or firmware. For example, a component can be a processor (e.g., a microprocessor, a controller, or other processing device), a process running on a processor, a controller, an object, an executable, a program, a storage device, a computer, a tablet PC or a user equipment (e.g., mobile phone, etc.) with a processing device. By way of illustration, an application running on a server and the server can also be a component. One or more components can reside within a process, and a component can be localized on one computer or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local or remote processes such as in accordance with a signal having one or more data packets (e.g., data from one component interacting with another component in a local system, distributed system, or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

In consideration of the above, various technologies are disclosed for obtaining aviation data pertaining to multiple aircrafts from multiple different databases by way of multiple different network connections and computing locations of the multiple aircrafts over various windows of time (where the locations are computed to address gaps that are included, for example, in aviation data generated by a transponder of the aircraft). In addition, the technologies described herein can merge the computed locations with geographic data, such that the technologies can be employed to compute fractional amounts of time that aircrafts are located in different predefined geographic regions (e.g., jurisdictions), regardless as to whether the aircrafts are in flight or on the ground Aircraft are a transitive asset thus making it difficult to accurately locate aircraft over time and determine a wholistic view of the aircraft's flights over a period of time, especially as it concerns traversal through different jurisdictional areas. Furthermore, aircraft owners at times have had the ability to mask and hide their movements using many methods to avoid detection, while organizations tasked with auditing the movement of aircraft lack the ability to search, discover, find, and prove the movement of aircraft. As can be ascertained, the inability of conventional computing systems to accurately track locations of aircrafts over time is a security risk; the technologies described herein address such risk.

In an aspect of the present disclosure, an aircraft analysis application is configured to compute a fractional portion of time spent by an aircraft in a particular geographical region. In an example, the aircraft analysis application retrieves transponder data output by a transponder affixed to an aircraft. The transponder data is indicative of locations of the aircraft over a period of time. As will be discussed in more detail herein, transponder data, by itself, is often unreliable in determining the complete movement of an aircraft. To overcome this problem, the aircraft analysis application uses the transponder data and various other aviation data from multiple different data sources to map the locations from the transponder data to a jurisdictional map. The jurisdictional map identifies certain geographic boundaries that define a plurality of jurisdictions. The aircraft analysis application may then compute a fractional portion of time spent by the aircraft in a particular jurisdiction. The aircraft analysis application may also generate a flight table indicative of a plurality of flights flown by the aircraft over a period of time as well as the time spent in each jurisdiction. In certain embodiments, time spent may be separated by time spent in the air and time spent on the ground.

Referring now to FIG. 1, an exemplary computing environment 100 is illustrated. The computing environment 100 comprises a first computing system 102. Briefly, the first computing system 102 is configured to retrieve aviation data from a plurality of disparate data sources and analyze the various data to generate jurisdictional status reports that are indicative of, among other things, an apportionment of time spent by an aircraft in various jurisdictions or miles traveled by the aircraft in the various territories or jurisdictions. The computing environment 100 can further include additional computing systems 104, 106 that are in communication with the first computing system 102 by way of a network 108 (e.g., a wide-area network, a local area network, an intranet, etc.). These additional computing systems 104, 106 can provide or supplement the various data employed by the first computing system 102 in connection with generating jurisdictional status reports.

The first computing system 102 includes a processor 110, memory 112, and a data store 114. The memory 112 stores an aircraft analysis application 113 that, when executed by the processor 110, cause the computing system 102 to perform various acts. The aircraft analysis application 113 comprises a flight data management component 116 and an aircraft status analysis component 118. Briefly, the flight data management component 116 is configured to receive and process flight data and transponder data and to generate a flight table that indicates a plurality of flights made by an aircraft and a plurality of locations of the aircraft that are associated with such flights. The aircraft status analysis component 118 is configured to determine a fractional portion of time spent in each of a plurality of jurisdictions to compute a status apportionment share for the aircraft in each of the jurisdictions. The status apportionment share may be used by organizations tasked with auditing aircraft movement and assessing how long an aircraft was in certain jurisdictions. In certain embodiments, the aircraft status analysis component 118 is further configured to determine a number of miles traveled by the aircraft in each of the jurisdictions.

The flight data management component 116 is configured to retrieve transponder data that indicates locations of a plurality of aircraft over a period of time. In certain embodiments, the flight data management component 116 retrieves transponder data directly from a transponder mounted on an aircraft (e.g., an ADS-B transponder). In some embodiments, flight data management component 116 can receive data from or interrogate a mode S transponder, or a mode C transponder. It is appreciated that flight data management component 116 may further retrieve transponder data from one or more transponder data stores. The flight data management component 116 stores the transponder data in the data store 114 as transponder data 120. In some embodiments, the flight data management component 116 retrieves the transponder data from a database storing such information, for example, the data store 130 of computing system 104. The second computing system 104 can include a transceiver 122. The transceiver 122 is configured to receive a signal output by a transponder 124 mounted on an aircraft 126, wherein the signal is indicative of locations of the aircraft 126 over time. The second computing system 104 stores the locations of the aircraft 126 as transponder data 128 in a data store 130 included in the second computing system 104. It is to be appreciated that the transceiver 122 can receive transponder signals from a plurality of aircraft, and thus that the transponder data 128 can include location data for a plurality of aircraft over the period of time. Transponder data may further include surveillance information such as altitude, flight level, speed information, an identification of an aircraft (e.g., tail number, call sign, or the like), emergency signaling, alerts, failed equipment, flight plan deviation(s), or other flight related information to the aircraft. In one aspect, the altitude and speed information can be used to confirm that the aircraft in question was taking off or landing at an airport. The transponder information can further include other aviation parameters, including, but not limited to, aircraft type, latitude, longitude, heading, or other aviation parameters. The flight data management component 116 can receive the transponder data 128 from the second computing system 104 and store it as the transponder data 120.

The flight data management component 116 can further retrieve flight data (e.g., ATC data, FAA SWIM data, JETNET data) that indicates flights taken by a plurality of aircraft. An Air Traffic Control (ATC) system records data of filed flight plans and actual air traffic radar hits. The ATC data can comprise, but is not limited to, a departure airport, an arrival airport, a departure date, a departure time, an arrival date, an arrival time, an aircraft type, a registration number, a call sign or the other traffic control system information. The registration number can serve as a vehicle identification number or tail number for the aircraft. The FAA SWIM Flight Data Publication Service (SFDPS) makes such data available to a limited audience. However, merely tracking this data is insufficient to gain a full picture of aircraft activity. There can be gaps in the ATC data. The most common instance of this occurs when an airplane flies to another airport under visual flight rules (VFR). In such an instance, it is possible for an aircraft to cross jurisdictional boundaries without creating an indication of the activity within the ATC data. Further complicating the tracking is that ATC data can sometimes use call signs in place of an aircraft registration number (i.e., "N-number"). Thus, it can be very challenging to obtain an accurate record of aircraft activity simply by examining ATC data.

The flight data management component 116 can retrieve the flight data from, for example, the third computing system 106. The flight data management component 116 generates and maintains a flight table based upon the flight data. The flight data management component 116 stores this flight table as flight table 132 in the data store 114. The flight data generally includes origin and destination points (e.g., airports) for each of the flights taken by the plurality of aircraft. The flight data may or may not include additional locations of these aircraft between their origin and destination points. Thus, a duration of time spent by an aircraft in each of various jurisdictions may be indeterminate based upon the flight data alone.

The flight data management component 116 may retrieve flight data from disparate sources (e.g., second computing system 104, third computing system 106, etc.) by constructing a query to search the disparate data sources for relevant information about one or more aircraft. In an example, flight data management component 116 may construct a query based on aircraft information received via transponder data. The flight data management component 116 may then execute the query at the disparate data sources to retrieve relevant information for corresponding aircraft. It is appreciated that the data retrieval process can be performed for a single aircraft or a plurality of aircraft, for example, aircraft belonging to a single entity.

The flight data management component 116 is further configured to generate a merged flight table by merging the transponder data 120 with the flight table 132 such that the flight table 132 includes both the flight data and the transponder data 120. The transponder data 120 comprises position information that indicates positions of aircraft over a period of time, but generally does not include linking data that indicates flights to which such position information pertains. To facilitate analysis of the flight table 132 by the aircraft status analysis component 118 in connection with generating jurisdictional status reports, the flight data management component 116 merges the transponder data 120 into the flight table 132 such that this position information is indexed by flight.

Figure 2:
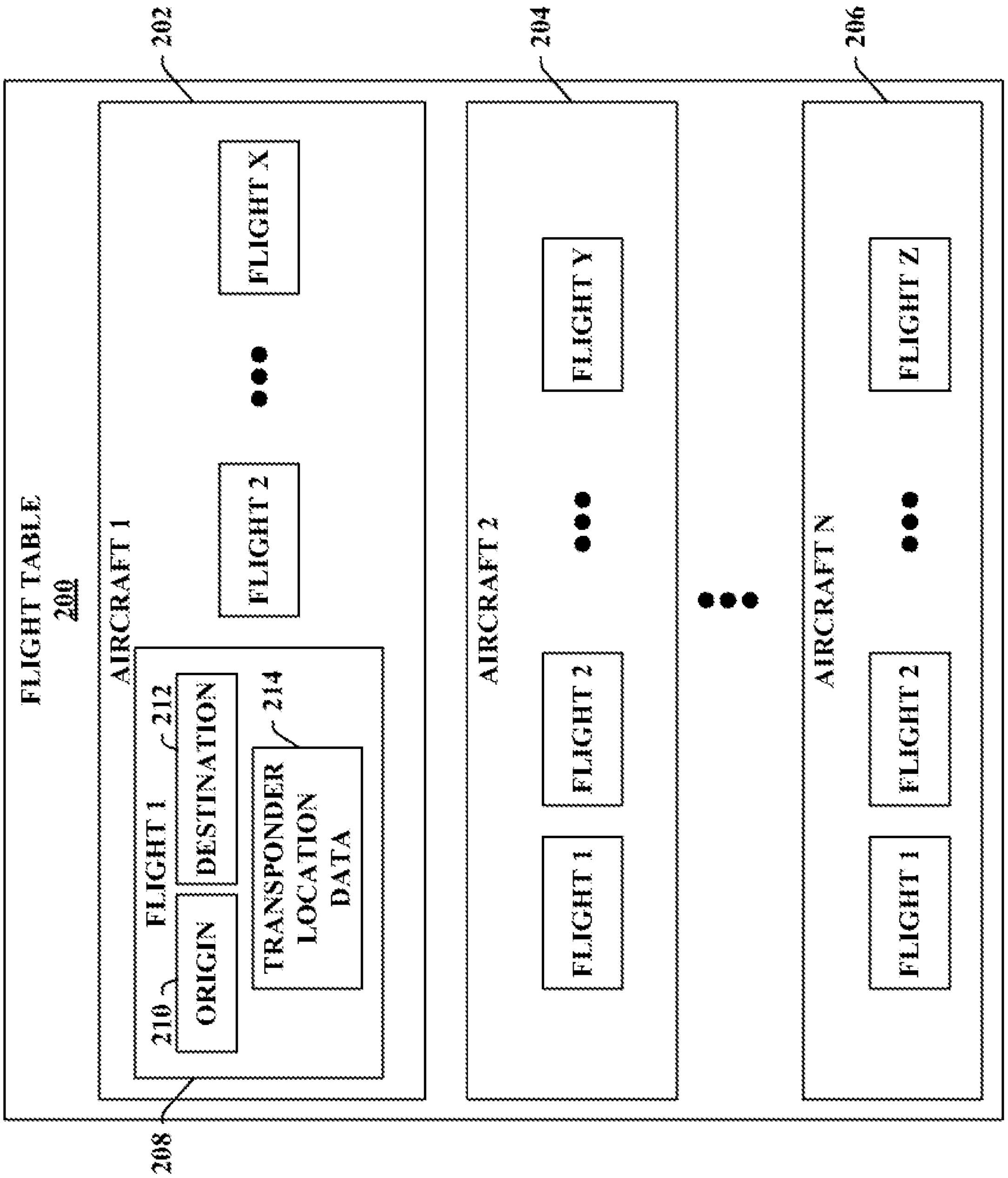
FIG. 2 illustrates an exemplary flight table as generated by the aircraft analysis system.

Referring now to FIG. 2 an exemplary flight table 200 is illustrated. The flight table 200 includes flight information arranged in groups 202-206 for each of a plurality of aircraft (e.g., N aircraft, where N is a positive integer). The first group of flight information 202 comprises entries pertaining to a plurality of x flights taken by a first aircraft, the second group of flight information 204 comprises entries pertaining to a plurality of y flights taken by a second aircraft, the Nth group of flight information 206 comprises entries pertaining to a plurality of z flights taken by an Nth aircraft, etc. The flight entries in the flight table 200 can include data indicating an origin of the flight, a destination of the flight, and/or any available transponder location data that indicates locations of the aircraft during the flight other than the origin or the destination. For example, the first group of flight information 202 pertaining to the first aircraft includes a first entry 208 representing a first flight taken by the aircraft. The first entry 1308 includes origin data 1310, destination data 1312, and transponder location data 1314.

Referring once again to FIG. 1, the flight data management component 116 is configured to merge the transponder data 120 into the flight table 132 such that entries of the flight table 132 include transponder-derived location data (e.g., the transponder location data 214 in the flight table 200). The flight data management component 116 merges the transponder data 120 into the flight table 132 such that all information pertaining to a same flight for each aircraft is included in a single entry in the flight table 132. Thus, the flight data management component 116 is configured to avoid the creation of duplicate entries in the flight table 132 that are representative of a same flight of an aircraft.

The flight data management component 116 can merge the transponder data 120 into the flight table 132 based upon timestamps associated with the transponder data 120 and times of flights indicated in the flight table 132. For example, the flight data management component 116 can determine that a set of locations for an aircraft in the transponder data 120 have timestamps that correspond to times between a takeoff time and a landing time of a first flight of the aircraft in the transponder data 120. Thus, the flight data management component 116 determines that the set of locations of the aircraft are locations of the aircraft during the first flight of the aircraft. Responsive to so determining, the flight data management component 116 can merge the set of locations into an entry of the first flight of the aircraft in the flight table 132.

In another example, the flight data management component 116 can merge the transponder data 120 into the flight table 132 based upon determining that the transponder data 120 indicates that the aircraft landed at a first airport at a first time. The flight data management component 116 determines that a first entry in the flight table 132 is indicative of a first flight for which the aircraft landed at the first airport at the first time. Responsive to so determining, the flight data management component 116 merges a portion of the transponder data 120 that includes locations of the aircraft during the first flight represented by the first entry.

It is to be appreciated that the specific structure of the flight table 200 may vary from that shown in FIG. 2 while remaining consistent with the scope of the present disclosure. For instance, a flight table can be organized as entries each corresponding to a different respective flight, wherein each of the entries further includes data indicative of an aircraft to which such flight pertains. In such an example, entries of the flight table can be sorted (e.g., by the flight data management component 116) according to the aircraft to which the entries pertain such that entries representative of flights of a same aircraft are grouped together. Such arrangement is contemplated as being within the scope of the exemplary table depicted in FIG. 2.

It is to be appreciated that one or more flight entries in the flight table 132 can be based solely on the transponder data 120. For instance, the flight data management component 116 can determine, for various locations of a first aircraft indicated by the transponder data 120, that no flight entry exists in the flight table 132 to which such locations can be attributed. Such locations of the first aircraft are referred to herein as "unallocated locations." For instance, the flight data management component 116 can determine that such unallocated locations are associated with times that lie outside of the flight time indicated by any existing flight entries in the flight table 132. Responsive to determining that no flight entry exists in the flight table 132 for a portion of the transponder data 120, the flight data management component 116 can create an additional flight entry that includes that portion of the transponder data and is representative of a flight that includes the unallocated locations.

In connection with creating the additional flight entry, the flight data management component 116 can calculate a likely origin and a likely destination for the additional flight entry, based upon the locations of the aircraft indicated in the transponder data 120. In a non-limiting example, the flight data management component 116 determines that a first airport is a likely origin airport for the additional flight entry based upon a first-in-time location in the unallocated locations being within a threshold distance of the first airport. In this example, the flight data management component 116 calculates that the first airport is the likely origin airport based further upon velocity and/or altitude data associated with the unallocated locations. For instance, the transponder data 120 can indicate that the aircraft is at its cruising altitude and/or speed at the first-in-time location. In such instance, the flight data management component 116 can determine that the first airport is not the likely origin airport for the aircraft, even though the first-in-time location is within the threshold distance of the first airport. In another example, the flight data management component 116 can determine a likely origin and/or a likely destination for the additional flight entry based upon other routes commonly flown by the aircraft (e.g., as indicated by the transponder data 120 and/or other flight data included in the flight table 132). For instance, the unallocated locations can lie along a flight path that is commonly flown by the aircraft (as indicated by the transponder data 120 and/or the flight table 132). In such instance, the flight data management component 116 can infer that the likely origin/destination pertaining to the unallocated locations is the same as an origin/destination of the flight path that is commonly flown by the aircraft.

The aircraft status analysis component 118 determines a status and/or apportionment share of time spent or miles traveled in various jurisdictions based upon the flight table 132 and a jurisdictional map 134. As indicated above, the flight table 132 includes location and/or time data that indicates locations of aircraft over a period of time and/or times for which the aircraft was at such locations. The jurisdictional map 134 identifies geographical boundaries. The boundaries may be representative of a plurality of jurisdictions. In exemplary embodiments, the jurisdictional map 134 and locations of aircraft included in the flight table 132 can be denoted in a common coordinate system such that the locations of aircraft in the flight table 132 can be directly mapped to the jurisdictional map 134. In other embodiments, the jurisdictional map 134 and locations included in the flight table 132 are denoted in different coordinate systems. In such embodiments, the aircraft status analysis component 118 is configured to translate coordinates of the flight table locations to a coordinate system of the jurisdictional map 134 or vice versa.

By mapping the locations of aircraft included in the flight table 132 to the jurisdictional map 134, the aircraft status analysis component 118 can label each of a plurality of locations according to the jurisdiction in which those locations lie. Since flights can cross jurisdictional boundaries, it is to be appreciated that each flight entry in the flight table 132 may be associated with multiple jurisdictions indicated in the jurisdictional map 134. Thus, the aircraft status analysis component 118 can be configured to label individual locations (or sets of locations) within flight entries in the flight table 132 according to the jurisdiction within which such locations lie (as indicated by the jurisdictional map 134).

Upon mapping the locations of the aircraft indicated in the flight table 132 to the jurisdictional map 134, as described above, the aircraft status analysis component 118 computes a fractional portion of time spent and/or a fractional portion of mileage flown in one or more jurisdictions in the jurisdictional map 134. In exemplary embodiments, the fractional portion of time spent and/or mileage flown can be a fraction denoted relative to time spent/mileage flown in all other jurisdictions. For instance, if the jurisdictional map 134 represents boundaries of the fifty states of the United States, the fractional portion of time spent and/or mileage flown can be a fraction denoted relative to time spent/miles flown in all other U.S. states. In another exemplary embodiment, the fractional portion of time spent/mileage flown can be a fraction denoted relative to time spent/mileage flown in other jurisdictions in a same state. For instance, if the jurisdictional map 134 includes county-level jurisdictional boundaries, the aircraft status analysis component 118 can compute a fractional portion of time spent in a first county in a given state relative to the time spent in other counties of the given state (e.g., but not relative to the time spent in other states).

In some embodiments, the aircraft status analysis component 118 is configured to compute flight paths for various aircraft based upon the location and/or time data included in the flight table 132. In a non-limiting example, the aircraft status analysis component 118 can execute a fitting algorithm over locations of an aircraft included in a first entry in the flight table 132 that represents a first flight of the aircraft. The fitting algorithm can identify a best-fit flight path based upon the locations included in the first entry. The aircraft status analysis component 118 can identify the best-fit flight path as an estimated flight path of the aircraft during the first flight. In other embodiments, the aircraft status analysis component 118 can identify the estimated flight path as a path formed by straight-line connections between known locations of the aircraft in order of time (e.g., connect a first-in-time point to a second-in-time point, connect the second-in-time point to a third-in-time point, etc.). The aircraft status analysis component 118 can compute fractional portion of time spent or miles flown in the various jurisdictions indicated by the jurisdictional map based upon the estimated flight path.

The aircraft status analysis component 118, responsive to computing the fractional portion of time spent and/or miles flown in a first jurisdiction can generate a jurisdictional status report that includes an indication of the fractional portion of time spent and/or miles flown by the aircraft in the first jurisdiction. The aircraft status analysis component 118 can output the jurisdictional status report to a client computing device (e.g., the computing device 106, or other computing device), and cause graphical data indicative of the fractional portion of time spent and/or miles flown to be presented on a display the client computing device as a graphical indication included in the jurisdictional status report.

In some embodiments, the aircraft status analysis component 118 can include, in the jurisdictional status report 136, an image of a portion of a jurisdiction through which an aircraft has flown. The aircraft status analysis component 118 can overlay estimated flight paths or points indicative of known locations of the aircraft in the jurisdictional status report 136 to facilitate determination of aircraft movement over time.

In certain embodiments, the systems described herein can compute, for each of a plurality of aircraft, a confidence score that indicates a confidence that the aircraft was present in a certain jurisdiction for a certain period of time. The confidence score can be used for, among other things, assessing jurisdictional tax liability for the aircraft. The aircraft status analysis component 118 is configured to compute such confidence scores based upon the mapping of the locations in the flight table 132 to the jurisdictional map 134. By way of example, and not limitation, the aircraft status analysis component 118 can compute the confidence score based upon a density of known locations of an aircraft (e.g., as indicated by the transponder data 120) along an estimated flight path of the aircraft. In another, non-limiting example, the aircraft status analysis component 118 can compute the confidence score based upon gaps in locations of the aircraft indicated by the flight table 132 and/or whether such gaps cross jurisdictional boundaries indicated by the jurisdictional map 134 (e.g., a gap, not connected by a known flight, where a known location of an aircraft and a next-known location of the aircraft are in different jurisdictions).

In some embodiments, the aircraft status analysis component 118 can map the transponder data 120 directly to the jurisdictional map 134 and compute the fractional share of time spent in each of the jurisdictions included in the jurisdictional map without reference to other flight data included in the flight table 132 (such as FAA SWIM data).

The jurisdictional status reports generated by computing system 102 may be utilized to perform certain assessment calculations for purposes of auditing flight logs, verifying flight information, determining tax liability, or the like. In certain embodiments, the components of computing environment 100 may be integrated for use with additional systems described herein.

Figure 3:
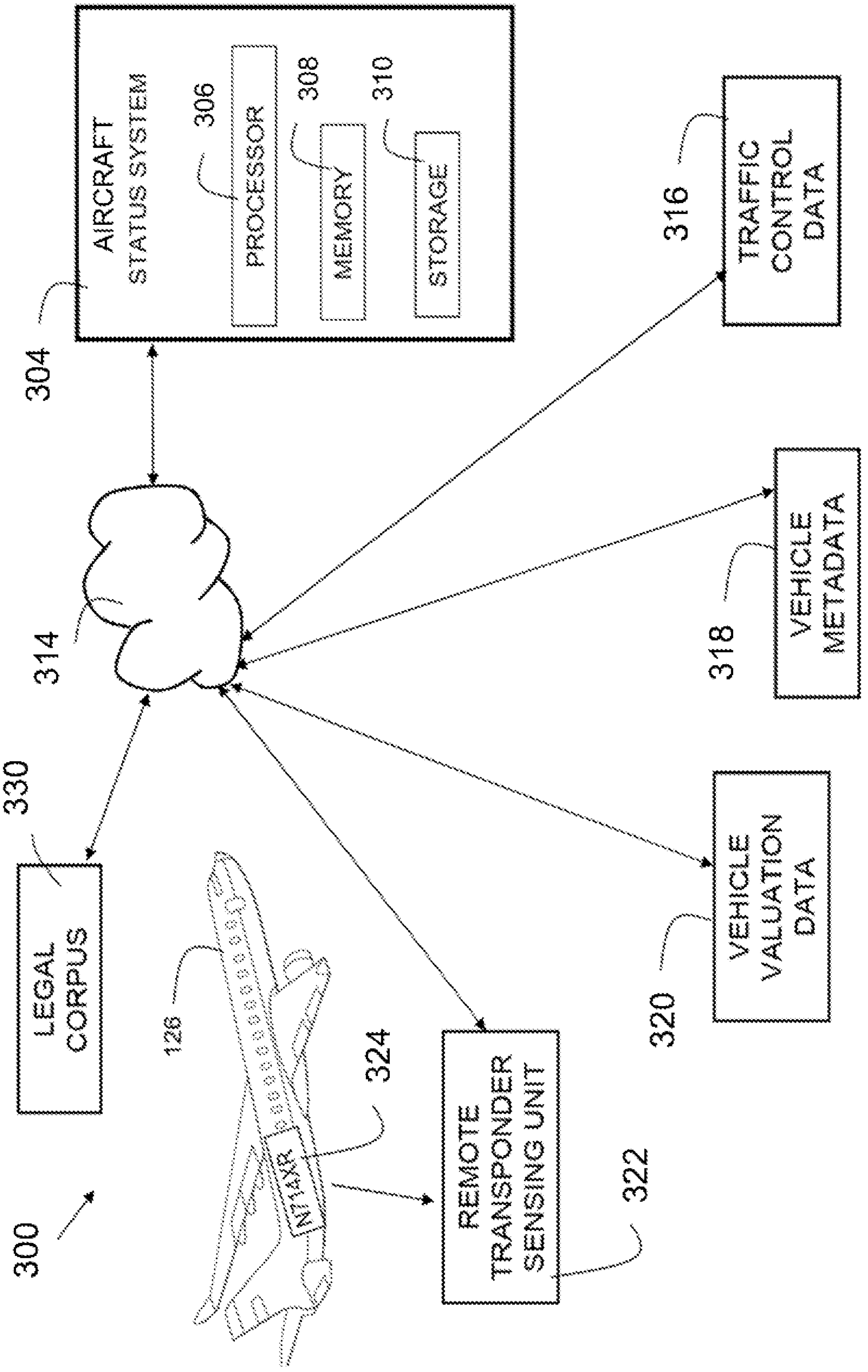
FIG. 3 illustrates an example system for generating a status report in accordance with the various technologies described herein.

FIG. 3 shows a system 300 for reporting an aircraft status for aircraft in one or more jurisdictions in accordance with aspects herein. It is appreciated that system 300 in connection with computing environment 100 may be utilized for obtaining aviation data pertaining to multiple aircrafts from multiple different databases by way of multiple different network connections and computing locations of the multiple aircrafts over various windows of time (where the locations are computed to address gaps that are included, for example, in aviation data generated by a transponder of the aircraft)." While described as separate systems, it is appreciated that the functionalities of system 300 and computing environment 100 may be readily combinable in accordance with the aspects described herein.

System 300 comprises an aircraft status system 304 that is configured to generate aircraft status reports based on a selected aircraft, airport, county, state, or other jurisdiction. In some embodiments, the aircraft status reports generated by system 300 are used to assess jurisdictional tax liability for certain aircraft. In an aspect, the aircraft status system 304 can be implemented as a computer comprising a processor 306, and memory 308 coupled to the processor. The memory 308 can be a non-transitory computer readable medium. Memory 308 can include RAM, ROM, flash, EEPROM, or other suitable storage technology. The memory 308 contains instructions, that when executed by processor 306, enable communication with a variety of other devices and data stores. In aspects, network 314 can include the Internet.

The aircraft status system 304 can communicate with an air traffic control data source 316. The air traffic control data source 316 can include data from the FAA SWIM Flight Data Publication Service (SFDPS). The air traffic control data can include, but is not limited to, a departure airport, an arrival airport, a departure date, a departure time, an arrival date, an arrival time, an aircraft type, a registration number, a call sign or the other traffic control system information. The registration number can serve as a vehicle identification number or tail number for the aircraft. The air traffic control data from the air traffic control data source 316 can be referred to as traffic control information, traffic control system information, or the like.

The aircraft status system 304 can communicate with a vehicle metadata source component 318. The vehicle metadata source component 318 can include FAA vehicle registration data. The vehicle metadata can include, but is not limited to, a vehicle serial number, an aircraft manufacturer name, an aircraft model (vehicle model type), an aircraft type, a year of manufacture for the aircraft (vehicle manufacture date), registered owner information, an engine manufacturer, or a vehicle engine type in addition to a significant amount of the vehicle specifications, equipment and statistics on said aircraft for purposes of evaluating the aircraft once jurisdiction is determined.

The aircraft status system 304 can be communicatively coupled with a vehicle valuation source component 320. The vehicle valuation source component 320 can include data from one or more subscription-based services to provide an estimate of current value based on individual aircraft details. Such services can include, but are not limited to, the Aircraft Blue Book and VREF valuation guides. The current value or estimated market value derived by the system 304 can be used as part of a tax liability assessment in certain cases, depending on the rules and regulations of a particular jurisdiction. In addition, the JETNET and AMSTAT® services can be utilized, which are aircraft databases that keep records on each and every aircraft for the system 304 to include owner information, operator information, pilot/Chief Pilot information, manufactured year, aircraft equipment and specifications, airframe/engine times, pictures of the aircraft and interior, etc., for generating an aircraft status report. The information in this system provides all of the particular details which feed the VREF, AMSTAT and an Appraisal database.

The data from the sources 316, 318, and 320 can be stored within storage 310. In aspects, a database format such as a structured query language (SQL) format, or other format, could be used to store the data. In various aspects, data can be filtered, output or exported in a different format, such as in comma separated values (CSV), to enable processing by spreadsheets or other programs, including in Word, Excel, PDF, or other particular document type. As such, the taxability status report of an aircraft or aircraft of a jurisdiction can be generated on an ongoing basis with updated information for an updated date range.

The system 300 can optionally include one or more remote transponder sensing units 322. The remote transponder sensing unit 322 is an electronic device that is installed in proximity to an airport such that it can detect transponder information from an aircraft 326 where the information includes a registration number 324 that is associated with the aircraft 326. The data from the remote transponder sensing unit 322 can be used to reconcile gaps in the air traffic control system information. In aspects, the remote transponder sensing unit 322 can receive information from an automatic dependent surveillance-broadcast (ADS-B) transponder, and receive data from or interrogate a mode S transponder, or a mode C transponder.

The transponder can be installed on an aircraft as part of its electronic safety equipment. It can broadcast an identifying code such as a registration number or other code that is linked to a registration number. In some aspects, the remote transponder sensing unit can interrogate the transponder in order to receive a reply from the transponder containing information or parameters related to a flight leg or at least a portion of a flight from take-off to landing. The transponder information can further include surveillance information such as altitude, flight level, speed information, an identification of an aircraft (e.g., tail number, call sign, or the like), emergency signaling, alerts, failed equipment, flight plan deviation(s), or other flight related information to the aircraft. In one aspect, the altitude and speed information can be used to confirm that the aircraft in question was taking off or landing at an airport. The transponder information can further include other aviation parameters, including, but not limited to, aircraft type, latitude, longitude, heading, or other aviation parameters. The transponder information can be utilized by the aircraft status system 304 for determining missing data in the traffic control system information, such as where a gap in aircraft data pertaining to a location and time, or related information evidence of presence of the aircraft within a particular jurisdiction (e.g., airport, state, county, or the like).

The system 300 can further be communicatively couple to a legal corpus 330 and communicate with the legal corpus 330 to access laws, rules, regulations, tax rates, and other information that can be used to analyze aircraft status and generate aircraft jurisdictional status reports. In certain embodiments, system 300 may determine computer-implemented automated estimated tax liabilities or a tax status for a particular jurisdiction in the generation of a aircraft status report. The legal corpus 330 can further include title or ownership information including registrations, chain of sales, pending suits, holds, chain of owner information, liens, other encumbrances, together with location information, addresses, or the like. This can be used in the generation of the aircraft status report for determining location(s), verification(s), paid/unpaid taxes, or registrations therein. The legal corpus information can be used together with traffic control system information, and transponder information to allow convenient notification of jurisdiction authorities regarding presence of an aircraft within the jurisdiction and potentially owed tax revenue from aircraft operators or owners based on evidence derived by one or more aircraft status reports with the system 304 for a particular aircraft, or list of aircraft in one or more jurisdictions.

The technologies described herein may combine data from the traffic control data source 316, vehicle metadata 318, vehicle valuation data 320, or remote transponder sensing unit 322 data to reconcile gaps in the traffic control data. The system 300 can then compute a primary location of the aircraft. A primary location of the aircraft may be used for the purposes of assessing property taxes, and estimate, based on information from legal corpus data 330, a tax liability that is owed to that jurisdiction for the aircraft 326. In certain embodiments, when the aircraft has primary locations which share tax reciprocity and apportionment, the system 300 can determine the prorate share to the multiple jurisdictions based on the aircraft status reports.

In certain embodiments, system 300 may obtain assessor information on paid taxes/paid registration fees, or taxes/fees assessed by county assessor(s) from another database. County-level assessor data can be used by the system 304 to identify where taxes have already been paid. The assessor information/data can include identification of aircraft (e.g., tail number, call sign, etc.), make, model, valuations, improvements, maintenance history, maintenance cost, owner address, associated service rentals (e.g., hangar address, towing use/address, other service locations/information), exemption information, duration of storage or location over a period, property description 1 use (e.g., commercial, private, etc.), or other assessment data at the county level over a given history or current data range. The system 304 can operate to cross-reference the aircraft status report based on traffic control system information, detected gap(s) (in a location presence, continuity of data, taxes paid, etc.), transponder data, or legal data from a first database with assessor information from one or more counties/states from a second database. The cross-referencing can include cross-checking or verifying taxes unpaid/paid or registration fees from a plurality of aircraft within a jurisdiction according to confidence scores, for example, with respect to a particular aircraft and a jurisdiction in the aircraft status report or an updated taxability status report.

Figure 4:
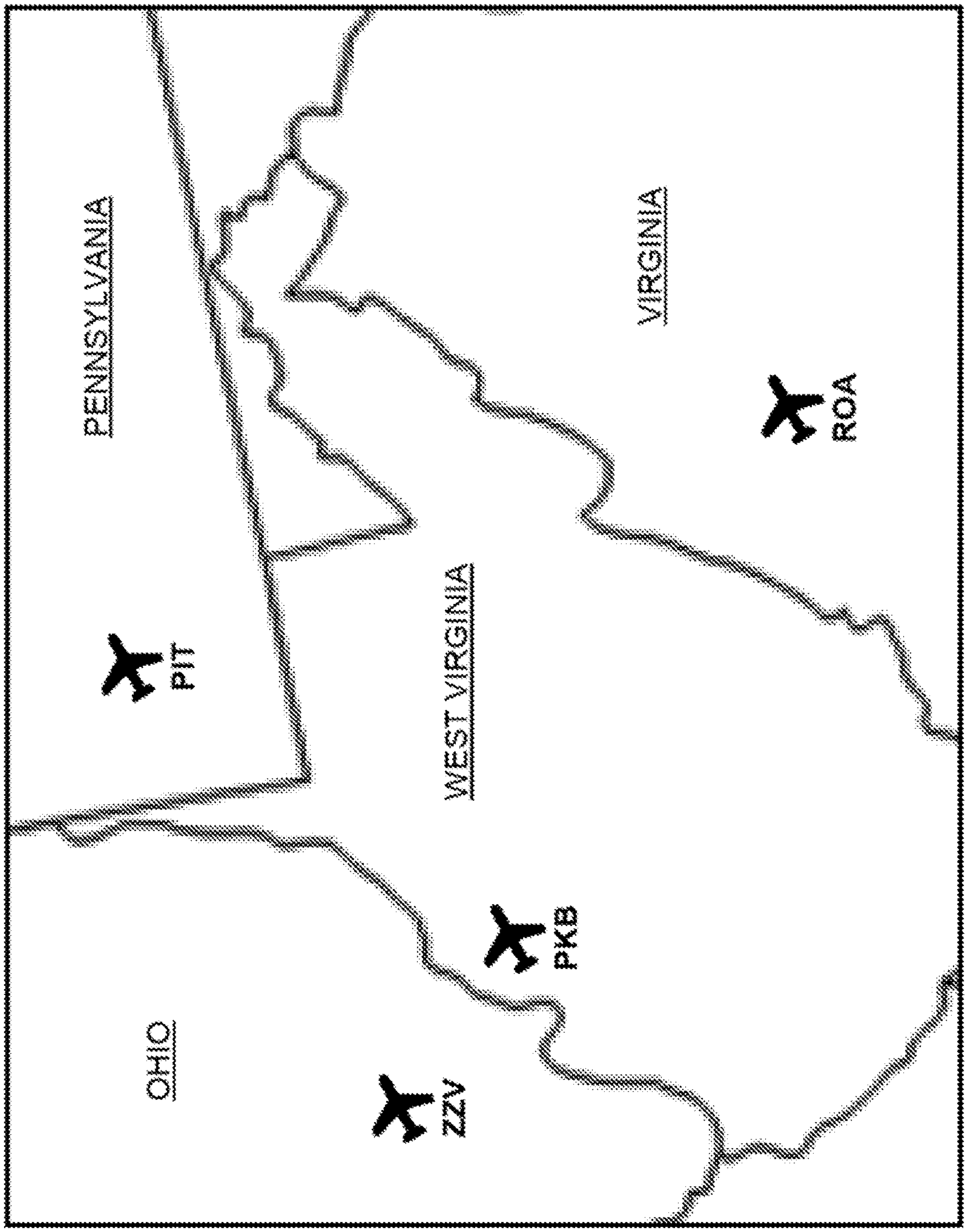
FIG. 4 illustrates an example of multiple jurisdictions for generating a status report in accordance with the various technologies described herein.

FIG. 4 shows examples of multiple jurisdictions. The map 400 indicates four airports. Airport ZZV corresponds to in Zanesville Municipal Airport in Muskingum County, Ohio. PKB corresponds to Mid-Ohio Valley Regional Airport in Wood County, West Virginia. ROA corresponds to Roanoke Regional Airport, in Roanoke County, Virginia. PIT corresponds to Pittsburgh International Airport Allegheny County, Pennsylvania. For the purposes of illustrating disclosed aspects, each of the states shown with an airport in map 400 is assumed to be distinct jurisdictions. This information is merely illustrative and is not intended to actual jurisdictional boundaries.

Referring still to FIG. 4, as an example, it will be demonstrated that, due to actions of the aircraft operator, the aircraft location as indicated by the air traffic control system is not always be indicative of the actual whereabouts of the aircraft. Again, based on the map 400, it can be possible for an aircraft operator (either intentionally, or unintentionally) to create a situation where an aircraft's presence in a jurisdiction can go undetected. By way of example, an aircraft operator can fly an aircraft to PKB with a flight plan, and thus, be indicated in air traffic control system data. The operator can then fly from PKB to ZZV under visual flight rules, and thus reside in Ohio, while appearing to be hangared in West Virginia. The various technologies described herein can identify such conditions by using obtaining data from various aviation databases to compute accurate aircraft status reports. In this example, when the aircraft lands at ZZV, even under VFR conditions, the registration number is detected based on transponder data from the aircraft, retrieved by the aircraft status system 304, and considered to be located in Ohio, even though the air traffic control system information does not indicate the VFR trip from PKB to ZZV. In this case, the presence of the aircraft in Ohio is verifiable by way of the aircraft status report.

In a similar manner, if an operator uses VFR to ferry an aircraft from PKB to ROA, and then VFR to again take the aircraft from ROA back to PKB, then the takeoff and landing from ROA has the potential to be unreported. By retrieving transponder data information, the aircraft status system 304 can accurately determine jurisdictional status information of the aircraft and ascertain that the aircraft had to have landed at ROA in Virginia, even though the air traffic control information does not indicate that the aircraft had travelled to ROA. Again, presence of the aircraft in Virginia is verifiable by way of the aircraft status report.

In a similar manner, if an aircraft spends 53% of the year hangared at PKB in West Virginia, and 40% of its time hangared at PIT in Pennsylvania, and the owner maintains a Pennsylvania address, then the primary location of the aircraft can be deemed to be Pennsylvania, even though that is not the location where the aircraft was hangared for the most time. Thus, in aspects, computing a primary location comprises: computing a list of airplane storage locations indexed by duration; selecting a primary location based on the owner address and a duration of an airport storage location from the list of airport storage locations, wherein the duration exceeds a predetermined threshold, and wherein the airplane storage location and the owner address are in a common jurisdiction.

In certain embodiments, the system 304 can further operate to import or obtain assessor data from database(s) communicatively coupled to various counties and states, filter through assessor data for aircraft at a particular airport or jurisdiction (county or state), and factor a confidence score for whether taxes or registration fees have been paid accordingly or as identified in a taxability status report that is initially generated. This can enable cross-checking and verification of aircraft and their associated tax status with particular qualities (e.g., model, make, age, or other associated information). The system 304 can thus generate reporting tables that enables cross-checking of data from various counties across the country for determining whether or not an aircraft or asset has paid taxes or registration fees for any given year or other date range. The system 304 can thus generate update aircraft status reports on a per aircraft, per county, per state, per airport basis according to historical and current searches of records for cross-verification of payment/registration. In aspect, the assessor data can overlap one or more gaps identified and be used with the transponder information to determine missing location or time information with a confidence level or score according to evidence that taxes/registrations have been historically paid or are being currently paid.

In an aspect, the system 304 can be configured to further generate detailed summary reports to include any aircraft that had evidence of being based or located in a specific state or county, or airport based on transponder information, traffic control system information, and assessor data. The system 304 can operate thus to calculate a factored percentage or confidence score for each aircraft in one or more jurisdictions that enables ranking the aircraft with respect to a level of certainty and related evidence associated with each aircraft.

FIG. 5 shows an example 500 of traffic control system data. This data can be stored within the various data stores described herein in a database format, CSV format, binary format, or other suitable data format, and retrieved by computing environment 100, system 300, etc. Column 502 shows a registration number (also referred to as a "tail number" or "N-number). Column 504 shows a call sign. Not all aircraft use a call sign, but some can use a call sign when interacting with the air traffic control system. Column 506 shows a departure location. Column 508 shows an arrival location. Column 510 shows an arrival date, indicating when the aircraft arrived at an airport. Column 512 shows a departure date, indicating when an aircraft departed an airport. Column 514 indicates a duration/stay at an airport by the aircraft.

Of particular note is the occurrence of gaps in the traffic control system data. For example, rows 522, 524, and 526 all pertain to the same aircraft, having a registration number of N714XR. Row 522 shows record of a flight from PIT to ROA. Row 524 shows the next flight of the aircraft from ROA to ZZV. Row 526 shows the next flight of the aircraft from PKB to ROA. Aspects detect that the departing location of a flight is different than the arrival location of the previous flight of that aircraft, and indicate it as a gap. Thus, a gap occurs when there is a mismatch between the departing location of a flight and the previous arrival of that flight. While it is possible that an aircraft can be moved on land (e.g. by truck) from one location to another, a more typical scenario to explain the gap is that the aircraft made a VFR flight from ZZV to PKB. Again, the transponder information from the aircraft is recorded, and retrieved by the systems described herein and the VFR flights can be considered so that the presence of an aircraft in each jurisdiction can verified. Row 528 shows data for an aircraft that is correlated with a call sign. In this case, the registration number N662CT is correlated with call sign ABC123.

Figure 6:
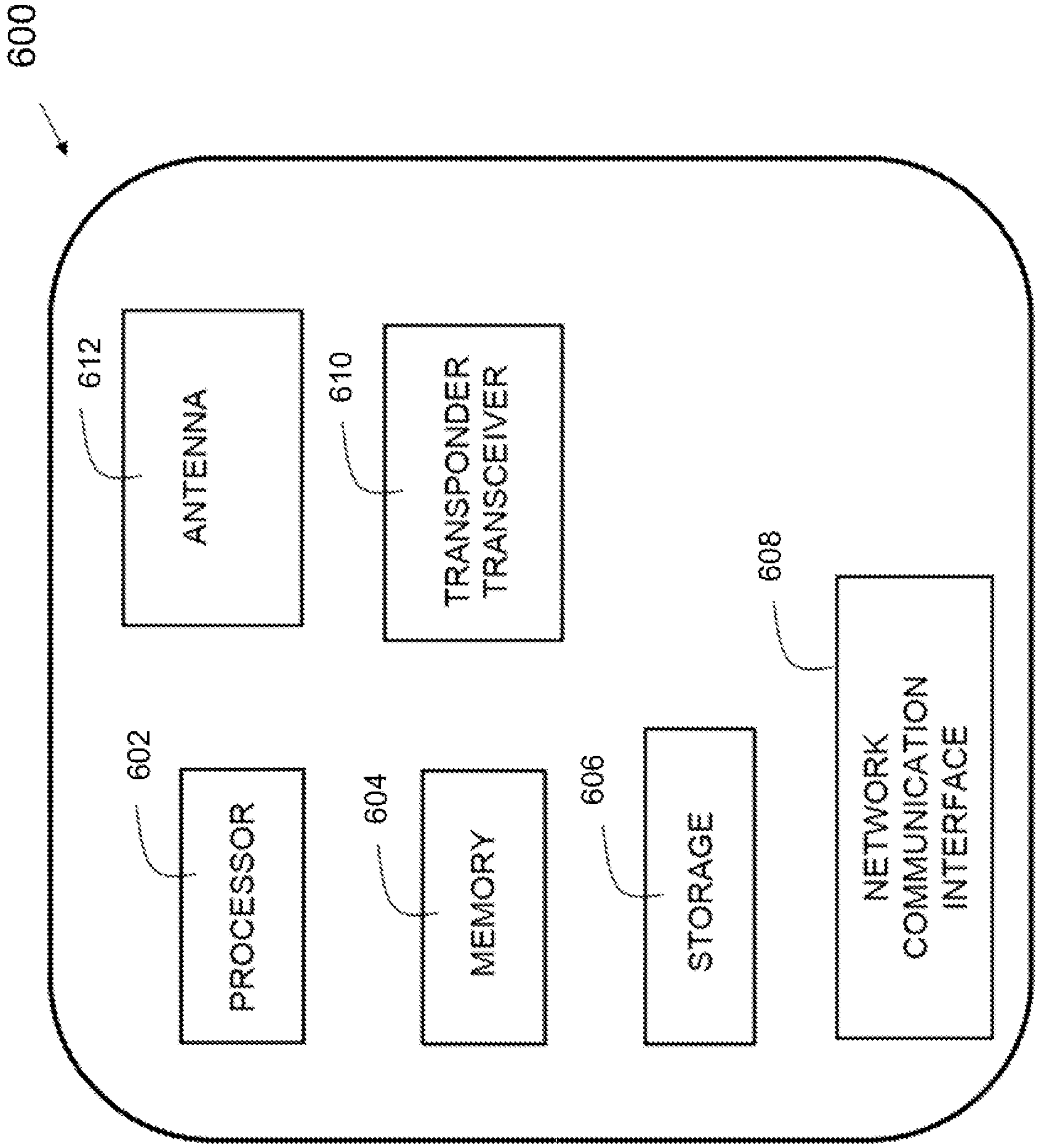
FIG. 6 illustrates an example block diagram of a remote transponder sensing unit in accordance with the various technologies described herein.

FIG. 6 is a block diagram of a remote transponder sensing unit 600 in accordance with aspects of the present disclosure and can be an example of the transponder 124 in FIG. 1 and the transponder unit 122 of FIG. 3. Remote transponder sensing unit 600 includes a processor 602, a memory 604 coupled to the processer 602, and storage 606. The memory 604 can be a non-transitory computer readable medium. Memory 604 can include RAM, ROM, flash, EEPROM, or other suitable storage technology. The memory 604 contains instructions, that when executed by processor 602, enable communication aircraft transponders via transponder transceiver 610. Transponder transceiver 610 has substantially identical features as transceiver 122 as described with reference to computer environment 100. The transceiver is coupled to antenna 612 to enable transmitting or receiving signals from aircraft. Remote transponder sensing unit 600 further includes a network communication interface 608. In aspects, network communication interface 608 includes a wireless communications interface such as a cellular data interface or a Wi-Fi interface. In aspects, the storage 606 stores aircraft activities (such as takeoffs and landings) detected from nearby transponders. The data can then be periodically downloaded by the aircraft status system 304 via network communication interface 608. In aspects, the remote transponder sensing unit 600 can be installed near an airport runway, such that it can receive the identifying data from an aircraft transponder as it takes off or lands. In aspects, the remote transponder sensing unit 600 can be used for associating a call sign with an aircraft registration number. For example, if air traffic control data has a record of an aircraft with a call sign of ABC123 landing at the same time that the remote transponder sensing unit 600 detects an aircraft with a registration number of N662CT, then the call sign of ABC123 is associated with the registration number of N662CT. Thus, aspects include associating a call sign with a registration number of the aircraft.

While the methods or process flows are illustrated and described herein as a series of acts (process flow steps, events, or operations), it will be appreciated that the illustrated ordering of such acts are not to be interpreted in a limiting sense. For example, some acts can occur in different orders/concurrently with other acts or events apart from those illustrated/described herein. In addition, not all illustrated acts can be necessarily utilized to implement one or more aspects or aspects of the description in this disclosure. Further, one or more of the acts depicted herein can be carried out in one or more separate acts/phases. Accordingly, it is appreciated that the process flows as depicted herein may be readily adaptable to computing environment 100 and/or system 300.

Figure 7:
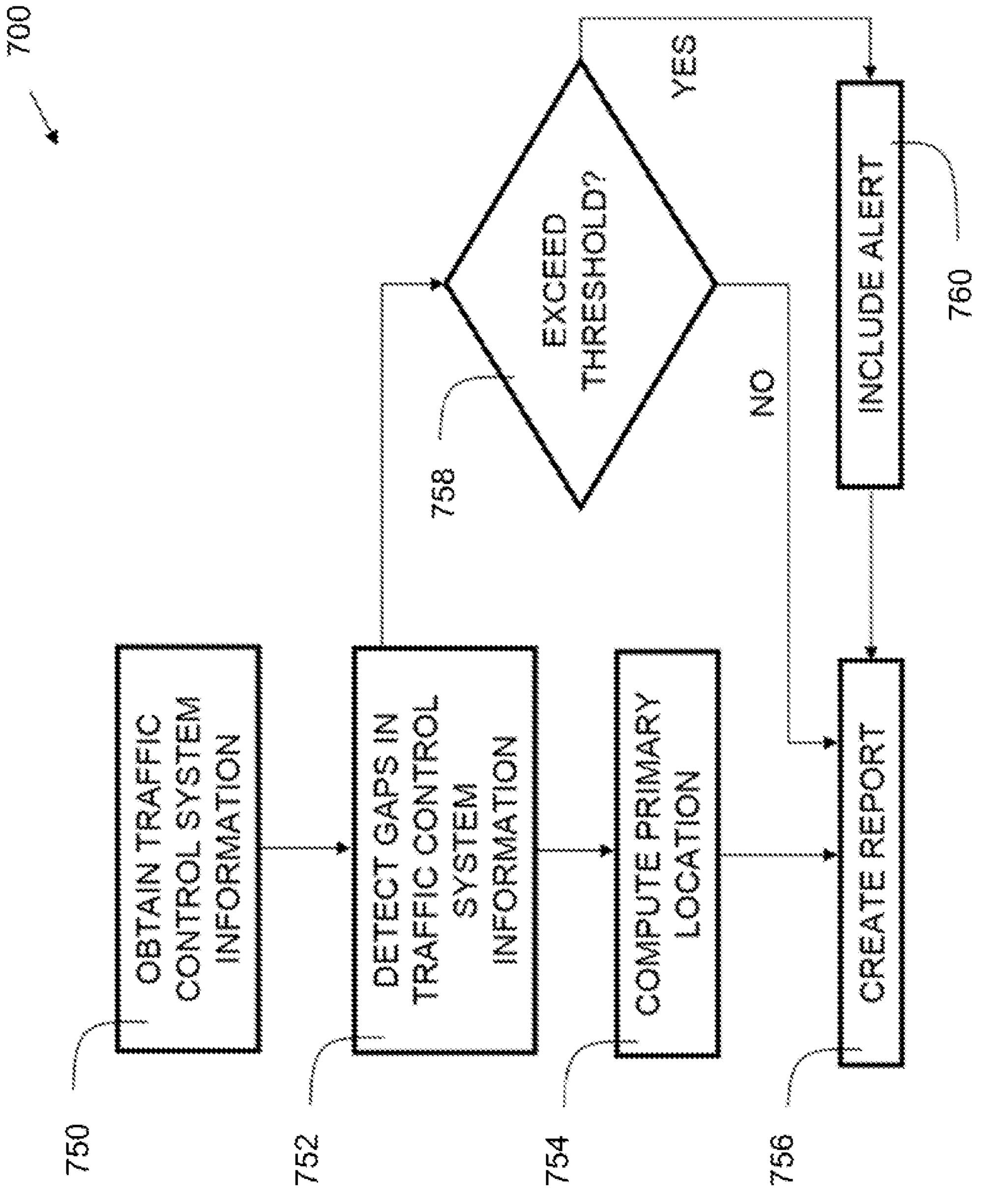
FIG. 7 illustrates an example process flow of acts associated with generating a status report in accordance with the various technologies described herein.

FIG. 7 shows a flowchart 700 indicating process steps for aspects of the present disclosure. In process step 750, traffic control system information is obtained, for example, by flight data management component 116. This can include data from the FAA SWIM Flight Data Publication Service (SFDPS) and well as the Remote Transponder Transceiver. In process step 752, gaps are detected in the traffic control system information. In aspects, this can include performing a check, for a given aircraft, that a departure airport matches the arrival airport of the previous landing. If it does not (as shown in row 526 of FIG. 5), then it is considered as a gap. In process step 754, a primary location is computed. In aspects, the primary location is the location the aircraft is deemed to be hangered. In certain embodiments, an aircraft may be determined as being "hangered" a particular jurisdiction for tax purposes. In process step 758, a check is made to see if the number of gaps detected exceeds a predetermined threshold. If so, then an alert is included at 760, which is included in the vehicular asset status report created at process step 756. The alert provides an indication that gaps exist in the aircraft status report that may be indicative of unreported movement of the aircraft. In some embodiments, the alert provides an indication of possible unrecovered tax revenue, due to gaps that can result in missing tax collection opportunities at various jurisdictions.

Figure 8:
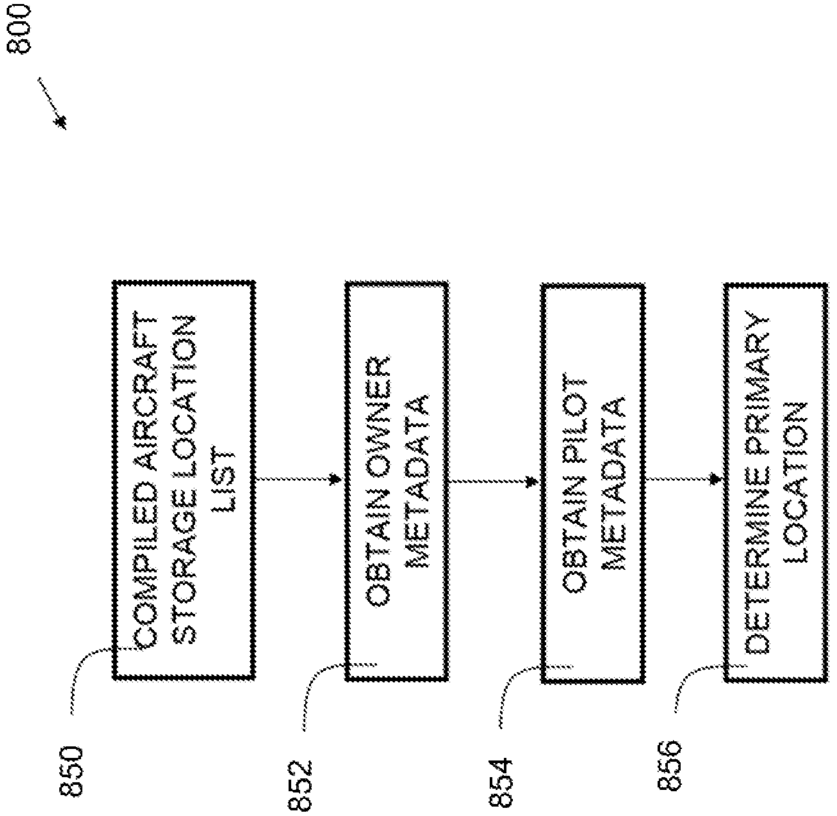
FIG. 8 illustrates another example process flow of acts associated with generating a status report in accordance with the various technologies described herein.

FIG. 8 shows a flowchart 800 indicating a process flow for aspects of the present disclosure. In some cases, the primary location is the location where the aircraft has been hangared for the most time within a given time period. However, in certain cases, another location can be considered as the primary location depending on place of residence based on domicile, evidence of intent to reside, physical location/address, or other factors. Other metadata, such as owner or pilot residence can be a factor in determining the primary location. In process step 850, an aircraft storage location list is compiled. In aspects, this can include the top three airports or other predefined number of airports where the aircraft spent the most time. In process step 852, owner metadata is obtained. In aspects, the owner metadata can be obtained from FAA registration information as traffic control system information, or other sources. In process step 854, pilot metadata is obtained, if available. In aspects, the pilot metadata can include an address or telephone number for the chief pilot of the aircraft. In process step 856 a primary location is determined. As stated previously, in some cases, the primary location can be augmented with the owner or pilot metadata as well as other data that is evaluated, including assessor data. As in the previously stated example, if an aircraft spends 53% of the year hangared at PKB in West Virginia, and 40% of its time hangared at PIT in Pennsylvania, and the owner has a Pennsylvania address, then the primary location of the aircraft can be deemed to be Pennsylvania, even though that is not the location where the aircraft was hangared for the most time.

As mentioned, advantageously, the techniques described herein can be applied to a number of various devices for employing the techniques and methods described herein. It is to be understood, therefore, that handheld, portable and other computing devices and computing objects of all kinds are contemplated for use in connection with the various non-limiting aspects, i.e., anywhere that a device can wish to engage on behalf of a user or set of users. Accordingly, the below general purpose remote computer described below in FIG. 9 is but one example of a computing device.

Although not required, non-limiting aspects can partly be implemented via an operating system, for use by a developer of services for a device or object, or included within application software that operates to perform one or more functional aspects of the various non-limiting aspects described herein. Software can be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 9:
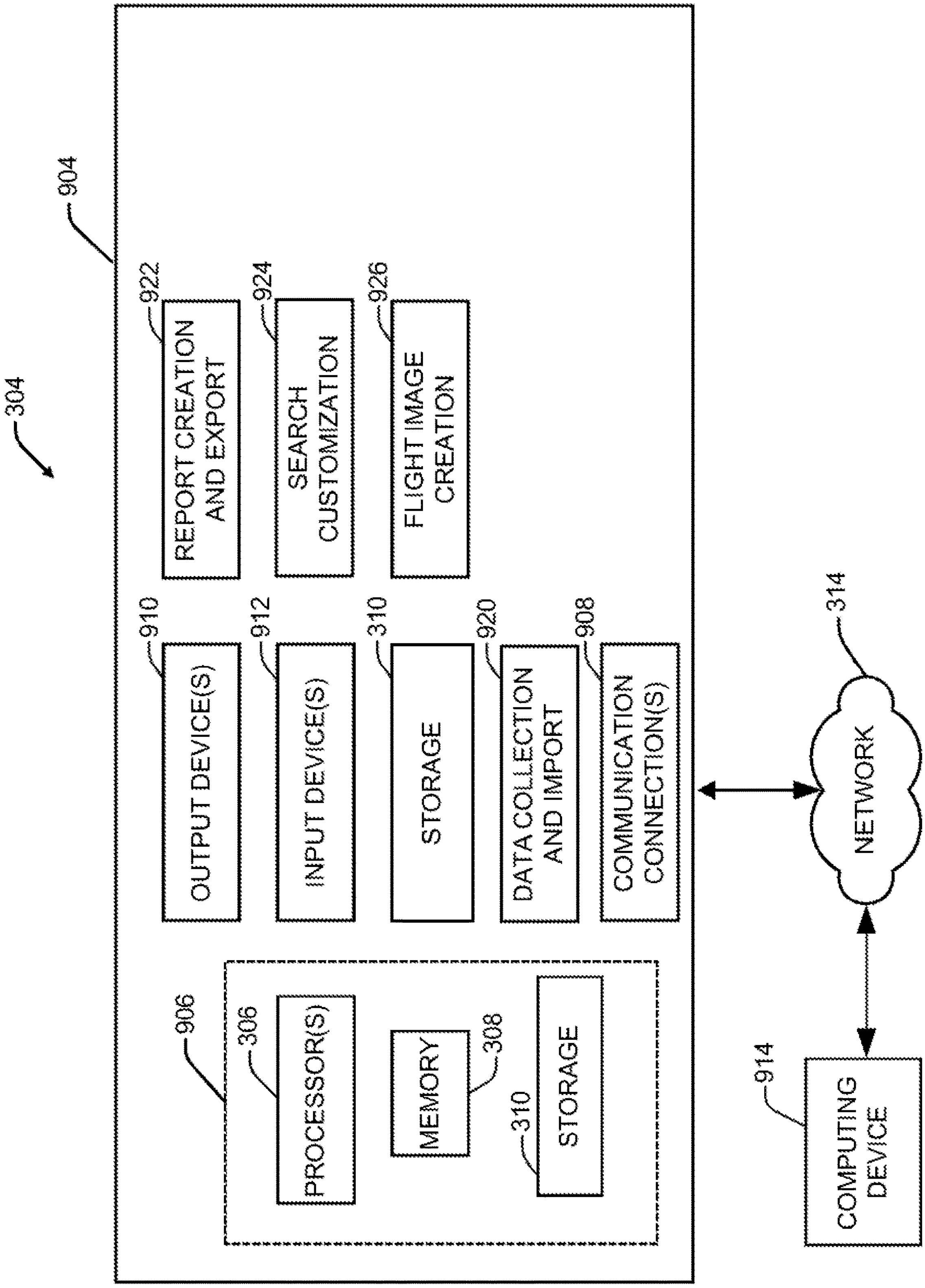
FIG. 9 illustrates an example computing device for generating a status report in accordance with the various technologies described herein.

FIG. 9 and the following discussion provide a brief, general description of a suitable computing environment to implement aspects of one or more of the aspects herein. Example computing devices include, but are not limited to, personal computers, server computers, handheld or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, aspects are described in the general context of "computer readable instructions" being executed by one or more computing devices. Computer readable instructions can be distributed via computer readable media (discussed below). Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 9 illustrates an exemplary computing device 904 configured to implement one or more aspects provided herein (e.g., via computing environment 100, system 300, etc.). In one configuration, computing device 904 includes at least one processor 306 and memory 308. Depending on the exact configuration and type of computing device, memory 308 can be volatile (such as RAM, for example), nonvolatile (such as ROM, flash memory, etc., for example) or some combination of the two. This configuration is illustrated in FIG. 9 by dashed line 906. In other aspects, device 904 can include additional features or functionality. For example, device 904 can also include additional storage (e.g., removable or non-removable) including, but not limited to, magnetic storage, optical storage, and the like. Such additional storage is illustrated in FIG. 9 by storage 310. In one aspect, computer readable instructions or executable components to implement one or more aspects provided herein can be in storage 310. Storage 310 can also store other computer readable instructions to implement an operating system, an application program, and the like. Computer readable instructions can be loaded in memory 308 for execution by processor 306, for example.

The term "computer readable media" as used herein includes computer storage media. Computer storage media includes volatile and nonvolatile, removable and non-removable media implemented in any method or technology for storage of information such as computer readable instructions or other data. Memory 308 and storage 310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 904. Any such computer storage media can be part of device 904.

Device 904 can also include communication connection(s) 908 that allows device 904 to communicate with other devices. Communication connection(s) 908 can include, but is not limited to, a modem, a Network Interface Card (NIC), an integrated network interface, a radio frequency transmitter/receiver, an infrared port, a USB connection, or other interfaces for connecting computing device 904 to other computing devices. Communication connection(s) 908 can include a wired connection or a wireless connection. Communication connection(s) 908 can transmit or receive communication media.

The term "computer readable media" can also include communication media. Communication media typically embodies computer readable instructions or other data that can be communicated in a "modulated data signal" such as a carrier wave or other transport mechanism and includes any information delivery media. The term "modulated data signal" can include a signal that has one or more of its characteristics set or changed in such a manner as to encode information in the signal.

Device 904 can include input device(s) 912 such as keyboard, mouse, pen, voice input device, touch input device, infrared cameras, video input devices, or any other input device. Output device(s) 910 such as one or more displays, speakers, printers, or any other output device can also be included in device 904. Input device(s) 912 and output device(s) 910 can be connected to device 904 via a wired connection, wireless connection, or any combination thereof. In one aspect, an input device or an output device from another computing device can be used as input device(s) 912 or output device(s) 910 for computing device 904.

Components of computing device 904 can be connected by various interconnects, such as a bus. Such interconnects can include a Peripheral Component Interconnect (PCI), such as PCI Express, a Universal Serial Bus (USB), firewire (IEEE 1394), an optical bus structure, and the like. In another aspect, components of computing device 904 can be interconnected by a network. For example, memory 308 can be comprised of multiple physical memory units located in different physical locations interconnected by a network.

Those skilled in the art will realize that storage devices utilized to store computer readable instructions can be distributed across a network. For example, a computing device 914 accessible via network 908 can store computer readable instructions to implement one or more aspects provided herein. Computing device 904 can access computing device 914 and download a part or all of the computer readable instructions for execution. Alternatively, computing device 904 can download pieces of the computer readable instructions, as needed, or some instructions can be executed at computing device 904 and some at computing device 914.

The device 904 can include a data collection and import component 920 communicatively coupled to the computing device 904 or integrated therewith. This enables the system 304 to evolve various aircraft monitoring regulations and procedures. In certain embodiments, different data can be collected and presented in aircraft status reports identifying aircraft, associated jurisdictions, and other relevant data for historical and current accountability of paid taxes and registration fees. The data collection and import component 920 can be configured to import future third party data (e.g., third party estimations) easily and seamlessly to compliment current offerings. It is important to note the ability for our system to import and accept new data as it becomes relevant and necessary for function.

In certain embodiments, the data collection and import component 920 can import assessor data as county assessor data or state assessor data, as well as tax assessed data from various other jurisdictions, including state, local, and county jurisdictions. The data collection and import component 920 can import and store assessor data from any county into one shared table or data set in order to cross-check data from various counties across the country. The system 304 can then process this data as a function of determining whether or not an aircraft has paid taxes or registration fees for a given year. Historical and current searches of records can then be analyzed for cross verification of payment/registration for updating any aircraft status report being generated. This assessor information can also be utilized in determining missing information resulting from any gap as well as aid in identifying any gap information. As stated previously, the assessor information/data can include identification of aircraft (e.g., tail number, call sign, etc.), make, model, valuations, improvements, maintenance history, maintenance cost, owner address, associated service rentals (e.g., hangar address, towing use/address, other service locations/information), exemption information, duration of storage or location over a period, property description 1 use (e.g., commercial, private, etc.), or other assessment data at the county level over a given history or current data range.

The data collection and import component 920 can operate to manage the following for a selected year or date range: active flight data as transponder data; active FAA data as part of air traffic control system information, and active assessor data (e.g., by county, state, or otherwise). The data collection and import component 920 can convert/process/calculate the relevant aircraft statistics, such as days at each airport, overnights at each airport, departures and arrivals from each airport, and associated gaps in the FAA data/traffic control system information.

The data collection and import component 920 can generate data collection tables/queries based on different variables or parameters. These can include, but not limited to, manufacturing and maintenance reports, ATRS reports, airport days, a base airport, a base count, aircraft flight times per aircraft, third party collection, aircraft landing total per airport, aircraft departure totals per airport, gaps or mismatches in flight data, gap counts, a combined list of aircraft per airport, a query linking bluebook values to each aircraft, registration data, an airport base summary, list of airports, jurisdictions, assessor data for each year obtained, bluebook data, or the like. The ATRS report can include a table that is generated and maintained from a custom report (e.g., a Crystal report) that sorts, orders and generates flight events to determine initial days before first departure, number of overnights at each departure (provided no gap), and final days following last arrival. The airport days can be a day count calculated by the data collection and import component 920 for each aircraft at each airport visited (through a series of queries that include departure days, arrival days, and non-flight days while preventing overlapping with multiple departures/arrivals in the same day, number of days prior to a first departure (from reported start date), and a number of days after last arrival (to reported end date) using data from the ATRS report data. The base airport can be calculated taking into consideration the airport with the most calculated days for each aircraft. A base count can be calculated stats for each base airport, to include total base legs (or flight paths) in comparison with total legs flown. The component 920 can also perform queries and query aircraft flight times per aircraft from the databases or storage to total flight time per aircraft. Aircraft landings total per airport can be total calculated landings at each airport being generated for each respective aircraft. Aircraft departure totals per airport can be generated for each aircraft associated with a particular jurisdiction, such as by a departure, arrival, maintenance work, sale, residence, owner residence, pilot residence, airport, taxes/registration paid, or other associated activity to the aircraft and the jurisdiction. The gaps can be a calculated or identified total of gaps found in flight data or data in relation to the aircraft being at a particular jurisdiction. A gap count can be the summary data of gaps with respect to total legs or flight paths flown from one point to another. The combined list per aircraft can be the result of a query of the data collection and import component 920 and generated for a particular airport using the calculated base airport, the third party identified base, and the assessor data.

A query can also be performed that links the Bluebook values of each aircraft respective of the year being reported, model/make, and year of manufacture (YOM). An airport base summary can be a generated table by the component 920 with a compilation of measurable data for each aircraft that is determined to be based on a selected airport in for the aircraft status report or an update thereof. In addition, data can be combined form public FAA registration databases, or combined in a query by the system. An airport list can include airports from an FAA list of airports and respective data. Assessor data can be combined for each year where assessor data was obtained or for each jurisdiction selected by input to the system. Bluebook data can be imported from a bluebook databased. The component or system can further query linking the make/model information found in Bluebook with that listed for each aircraft make/model in the flight data and FAA data. Each of the above variables or parameters can be generated with the aircraft status report along with other data based on one or more user inputs via the input device 912, and configured via the data collection and import component 920.

The device 904 can further include a report creation and export component 922 that can produce detailed airport summary reports as a part of a aircraft status report that includes aircraft that had evidence of being based in a specific state/county. This includes, but is not limited to, a system calculated factor percentage for each aircraft that helps rank the aircraft with respect to the level of certainty and related evidence associated with each aircraft. The aircraft can be ranked according to confidence scores that are factored based on or in relation to assessor data obtained from a plurality of jurisdictions including city or state jurisdictions. In certain embodiments, confidence scores can be generated according to a level of confidence that taxes or registration fees have been paid based on the traffic system control information, transponder data, and assessor data from one or more jurisdictions.

The assessor data can be selected to overlap with the gap data to further give confidence or assess gap information or missing information that may occur over a period of time (e.g., in a given tax year), aid in identifying additional gap information not identified, or give evidence of history or activity of the aircraft, of taxes or fees paid, along with strengthening valuation estimates. The confidence scores can be determined according to a specific time period (e.g., a tax year, a quarter, or other time frame) for which the assessor data is obtained. A listing of aircraft can be ranked for a jurisdiction or airport based on the confidence scores for whether an aircraft has a tax liability or registration fee liability remaining to be paid or required and be associated with each of the aircraft in one or more states/counties across the selected time period. An updated aircraft status report can then be generated with a top tier of aircraft (e.g., top 25% or otherwise), or for each of the one or more states or counties based on the ranking, for example.

The report creation and export component 922 can further create or export databases for FAA registration information including, but not limited to, certificate date, aircraft manufacturer, aircraft model, aircraft year of manufacture, an owner name, or an owner address. This can include calculated years owned, an estimated purchase value, a reported flight time for selected date range, a third party identified base airport for further confirmation and associated statistics (days visited, overnights, departures, arrivals, total flight paths (legs) flown, a calculated base airport, a base leg count, a number of gaps in the flight data, the airport with most landings, first departure airport and date, assessed airport if applicable, a retail value or current market value, pilot residence, etc.). In addition, any maintenance records, maintenance activity, maintenance address, maintenance cost or damage description can be obtained from any one of aircraft mechanic databases. This could assist in valuation and tax assessment confidence to be used or cross-checked with county/state assessor data or other assessor data as a part of determining and comparing confidence scores.

The report creation and export component 922 can further generate aircraft status reports according to aircraft, airport, or jurisdiction including state or county with associated aircraft over a period of time or date range (e.g., a tax year, quarter or the other increment). The device 904 can thus operate to produce aircraft/asset specific detail reports to include any one combination or all of information discussed herein, along with images of aircraft, images of flight paths around an identified base airport as a primary location herein, flight activity details for each leg flown, operator information, and other associated FAA ownership information. Other details, such as additional equipment, sales transaction dates and notable tail number changes, and information that specifically characterizes the asset further can also be reflected on this report based on evidence obtained, inferred, or provided via one or more databases and sets of information (e.g., traffic control system (FAA information), transponder information on activity, assessor information from counties/states, etc.).

In an aspect, independent aircraft valuation can be performed by the report creation and export component 922. Such valuation can take into account past records, bluebook values, Vref valuation guides and appraisals, market sales prices and an associated trend (e.g., high/low/average market tiers), as well as third party estimations/evaluations. The results of the valuation can be provided in the aircraft status report for indicating an amount of taxes due or assessing future estimated payments, for example.

The device 904 can further include a search customization component 924 to receive user input, select found aircraft and add them to the internal accounts being managed and reported for generation of aircraft status reporting. The search customization component 924 can control account management functions. With each account selection, detailed stats for that asset in selected year are saved for future use, management, tracking, and reporting (e.g., via the report creation and export component 922), where automated report management can be exported to documents types such as PDF, Excel, or other particular document type. Additionally, specific tax code functions can be selected for each State/County.

An advantage of the device 904 (or computing environment 100, system 304) is that processes can remain consistent to manage millions of flight records per year. In particular, computing environment 100 and system 304 can be configured to report on or generate reports for more than one year or other time frame at a time, while also being flexible to accommodate assessor fiscal years that do not follow a typical January 1-December 31 standard.

The flight image creation component 926 can further operate to create flight path images without a need to import these from a third-party vendor. Using the data obtained from databases, the flight image creation component 926 can create the flight path tracking and images on a per aircraft, per year basis, or as demanded.

The device 904 (computing environment 100 and/or system 304) can thus quickly observe all airports within a selected county using an imported FAA airport database by obtaining traffic control system information, while further tailoring producing reports unique for each State/County. The device 904 dynamically changes and adapts to different tax laws in different jurisdictions. In an aspect, the device 904 enables a user client to determine the most important measurements, valuations, dates, documents set forth by the tax codes so that the system 304 has the ability to tailor the services/reports/data to fit the needs of any tax code.

Advantages to the device 904 is being able to analyze what documentation is provided by the aircraft owners to apply the appropriate tax code on a measurement basis (i.e., where an aircraft registers in comparison to where it is physically and habitually located for a specific period of time measured in hours/days/years). Reports can be generated as discussed herein based on a jurisdiction level (e.g., by state or county) reflecting the number of calculated aircraft based in respective state and associated statistics. An aircraft report can be generated that reflects the flight activity for selected year or time frame, along with the associated measurements, parameters, variables, etc., described herein, including producing a highly accurate desktop valuation of an asset using historical sales as well as the above-mentioned factors.

Figure 10:
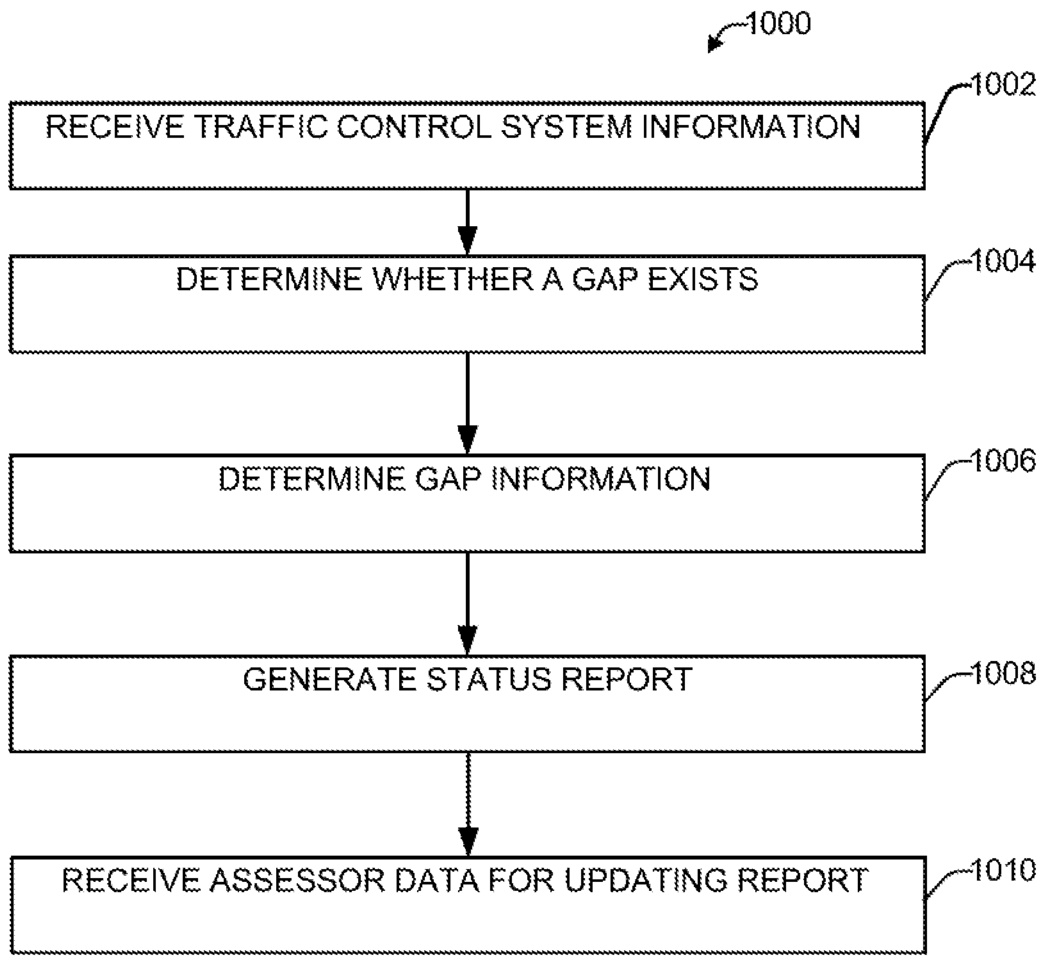
FIG. 10 illustrates another example process flow of acts associated with generating a status report in accordance with the various technologies described herein.

FIG. 10 illustrates a process flow 1000 for generating a aircraft status report and updating the report with assessor data in accordance with various aspects. At 1002, the process flow initiates with receiving traffic control system information associated with the aircraft from a first database or storage. At 1004, the device 904 (or computing environment 100, system 304, etc.) can determine whether a gap between a departure and an arrival of the aircraft is in the traffic control system information. The gap can be missing information or a mismatch between a departure location of the aircraft and an arrival location of the aircraft that indicates a missing time and a missing location of the aircraft at the airport. At 1006, in response to determining a gap is in the traffic control system information, the process flow includes determining the missing time and the missing location based on the transponder data obtained/received. At 1008, an aircraft status report associated with the aircraft is generated based on the traffic control system information and the transponder information, as well as the missing time and the missing location. At 1010, the process flow continues with receiving assessor data associated with a period of time that overlaps with the gap from at least one second database. The assessor data can include tax data associated with the aircraft that is indicative of taxes paid in relation to at least one of the airport, the gap, a state or a county. This enables the aircraft status report to then be cross-checked by the device 904/system 304 with the assessor data to generate an updated aircraft status report. The assessor data can be received from a plurality of states or counties or their associated databases as well be associated with an aircraft in question for the report.

In an aspect, device 904/computing environment 100/ system 304 can operate to determine a primary location of from among all airports that the aircraft arrived or departed from and least one of: the traffic control system information or the transponder data. Additionally, or alternatively, the device 904/computing environment 100/system 304 can generate a data set of a group or list aircraft for the aircraft status report in relation to a particular airport based on a different states or different counties with the assessor data, one or more first primary locations of the aircraft from the traffic control system information, and one or more second primary locations of the aircraft from an amount of time at each airport that the aircraft arrived or departed from based on the transponder data or other information.

The cross check of the aircraft status report with the assessor data can be based on confidence scores associated with different airports that the aircraft arrived or departed from. In certain embodiments, the assessor data can provide indications of taxes paid by the tax data, or a registration of the aircraft, in relation to various states or counties, the airport, the gap, an unaccounted gap, or other jurisdiction. An updated aircraft status report can be generated based on the cross-check to indicate or verify a confidence level of the taxes paid in relation to the states or counties, or a registration of the aircraft in relation thereto. The aircraft can further be ranked based on the confidence scores, which indicate a confidence level of taxes paid or the registration associated with each of the plurality of aircraft in a state or a county. The aircraft status report can further be updated with one or more flight path image based on the aircraft and a duration of time with the aircraft status report of the aircraft and a set of associated activity details, wherein the associated activity details include at least one of: a primary location, each departure and arrival of the aircraft within a range of the primary location including one or more other airports, maintenance locations, maintenance transactions, description of maintenance, a current market valuation of the aircraft, sales transaction dates, or a tail number change.

Figure 11:
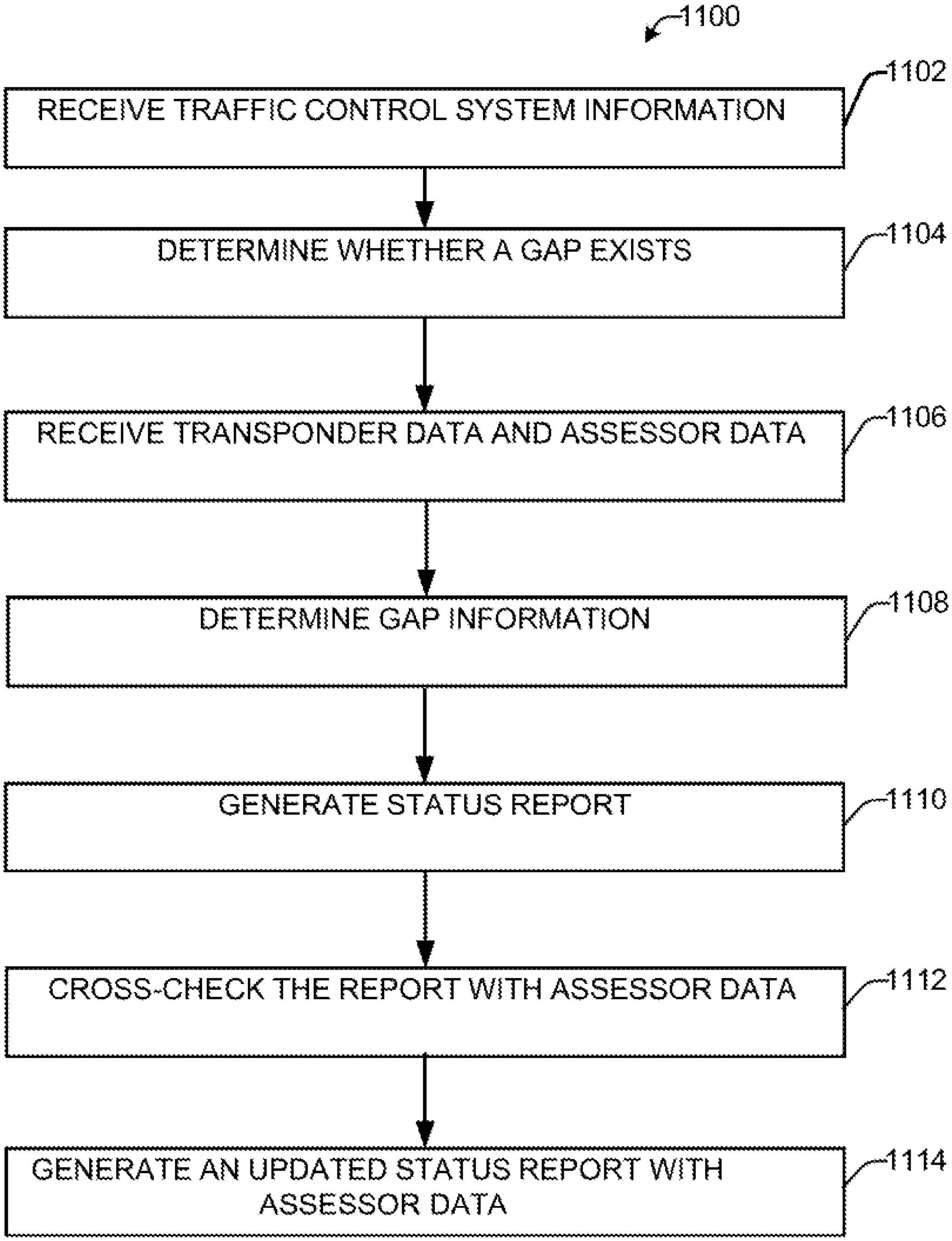
FIG. 11 illustrates another example process flow of acts associated with generating a status report in accordance with the various technologies described herein.

FIG. 11 illustrates another example process flow 1100 for generating a aircraft status report and updating the report with assessor data in accordance with various aspects. At 1102, traffic control system information is received via the system 304 or device 904 associated with an aircraft from a first database. At 1104, a determination is made whether a gap occurs between a departure location of the aircraft and an arrival location of the aircraft that indicating a missing time and a missing location of the aircraft at an airport. At 1106, transponder data from a transponder mounted on the aircraft can be received by a transceiver positioned in proximity to the airport, which can be from an airport database or other storage, for example. In addition, assessor data associated with a period of time that overlaps with the gap from at least one second database can be received. The assessor data can include tax data associated with the aircraft and indicative of paid taxes or a registration occurring in relation to at least one of a state, a county, the airport, the gap or an unaccounted for gap of information identified by either the transponder data, the assessor data or both. At 1108, missing information (gap information) can be determined by the transponder data and the assessor data both. At 1110, an aircraft status report of the aircraft can be generated based on the traffic control system information and the missing information. At 1112 a cross-check of the aircraft status report can be performed with the assessor data across a plurality of jurisdictions comprising at least one of: the airport, a state or a county for the aircraft. The assessor data comprises the tax data associated with the aircraft indicative of the paid taxes or the registration in the plurality of jurisdictions. At 1114, an updated aircraft status report is generated based on the cross-check.

In an aspect, the cross-check of the aircraft status report is based on confidence scores associated with various airports that the aircraft arrived or departed from and taxes/registration fees having been paid in an associated jurisdiction. The aircraft can be ranked based on the confidence scores. The confidence scores can indicate a confidence level of the paid taxes or the one or more registrations associated with each of the plurality of aircraft in the state, the county, or the plurality of jurisdictions across a selected time period. Reports for a top tier or threshold of aircraft indicated as not having paid taxes or registrations could be sent to any one of the jurisdictions at a state or local level. Additionally, or alternatively, those having paid could be communicated as well, or all reports could be sent that are associated with each aircraft, and updated on a regular periodic basis.

Each report could further include flight path images around the at least one primary location based on the aircraft status report over the period of time for the updated aircraft status report. The updated aircraft status report comprises associated activity details indicative of the taxes paid. The associated activity details can include a primary location, each departure and arrival of the aircraft within a range of the primary location that includes one or more other airports, one or more maintenance locations, one or more maintenance transactions, a description of maintenance, a current market valuation of the aircraft, one or more sales transaction dates, a tail number change, or other relevant tax/fee information associated with aircraft in a jurisdiction.

Figure 12:
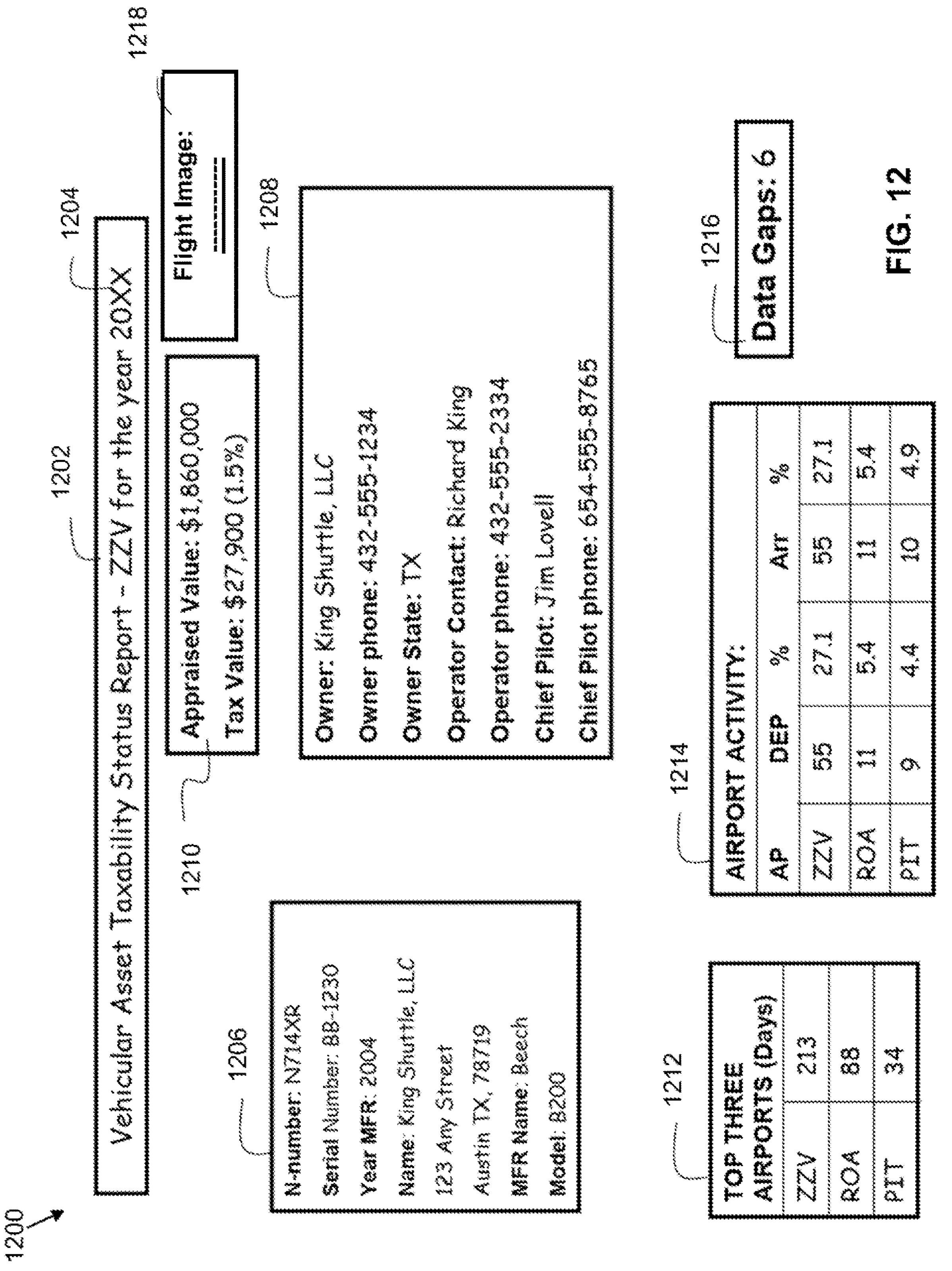
FIG. 12 illustrates an example vehicular asset status report in accordance with the various technologies described herein.

FIG. 12 shows an exemplary vehicular asset status report 1200 in accordance with aspects of the present disclosure. In aspects, the report 1200 can be prepared for a given aircraft, and the tax liability can be assessed for a given airport 1202, for a given tax period 1204.

The report 1200 can include a registration section 1206. In aspects, the registration section 1206 can include, but is not limited to a registration number for the aircraft, a serial number for the aircraft, a manufacture year for the aircraft, a name of the operator, an address of the operator, the manufacturer of the aircraft, or the model of the aircraft.

The report 1200 can include a personnel section 1208. In aspects, the personnel section 1208 can include, but is not limited to an owner name, an owner phone number, an owner state, an operator contact, an operator phone number, a chief pilot name, or a chief pilot phone number.

The report 1200 can include an estimated tax liability section 1210. In aspects, the estimated tax liability section 1210 can include, but is not limited to an appraised value, and a tax value. The appraised value can be determined based on vehicle metadata 318 and vehicle valuation data 320. The tax value can be based on information obtained from legal corpus 330 which can include rules, regulations, tax tables, and other tax information for one or more jurisdictions.

The report 1200 can include a most frequently visited airport section 1212. In aspects, the most frequently visited airport section 1212 can include, but is not limited to the top three airports visited, and the amount of time spent at each of the airports within the tax period.

The report 1200 can include an airport activity section 1214. In aspects, the airport activity section 1214 can include, but is not limited to the number of arrivals and departures at each of the airports listed in most frequently visited airport section 1212. The airport activity section 1214 can further include airports, departures, arrivals and a percentage score.

The report 1200 can include a data gaps section 1216. The data gaps section provides an indication of how many data gaps exist within the tax period of the report. While a few gaps can be expected over the course of a year, if there are too many gaps, then an alert message can be included in the report to call attention to the excessive number of gaps. Thus, aspects include indicating an alert on the report in response to detecting gaps above a predetermined threshold.

In addition to the information shown in FIG. 12, the report can be updated with assessor data, confidence scores of taxes paid, flight images 1218 a variety of additional information can be shown. Furthermore, report generation options can include information organized in numerous ways. Aspects can include data organized by airport or by aircraft. Aspects can include filters that show data only for aircraft that have landed at an airport in excess of a predetermined number of landings. Aspects can include filters that show data only for aircraft that have been hangared at an airport in excess of a predetermined number of days. Aspects can include filters that show data only for aircraft that have traffic control data gaps in excess of a predetermined number of gaps. Other filters and sorting methods are possible to facilitate convenient and effective collection of tax revenue based on aircraft value and itinerary.

Although the disclosure has been shown and described with respect to a certain preferred aspects or aspects, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary aspects of the disclosure. In addition, while a particular feature of the disclosure can have been disclosed with respect to only one of several aspects, such feature can be combined with one or more features of the other aspects as can be desired and advantageous for any given or particular application.

Figure 13:
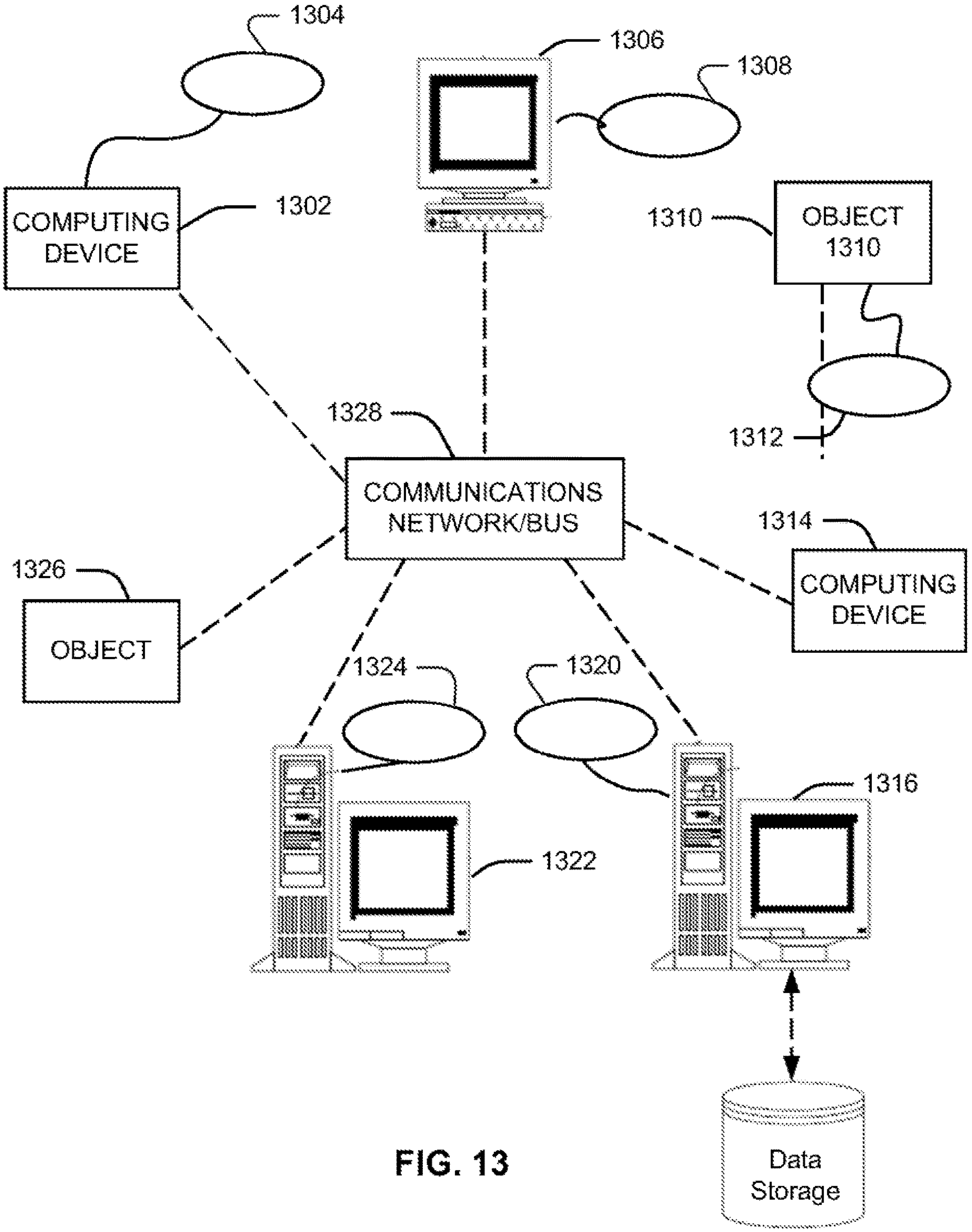
FIG. 13 is a block diagram representing exemplary non-limiting networked environments in which the various technologies described herein can be implemented.

FIG. 13 provides a schematic diagram of an exemplary networked or distributed computing environment that can be integrated with or operate as the computing environment 100, system 304 or device 904. The distributed computing environment comprises computing objects 1310, 1326, etc. and computing objects or devices 1302, 1306, 1314, 1316, 1322, etc., which can include programs, methods, data stores, programmable logic, etc., as represented by applications 1304, 1308, 1312, 1320, 1324. It can be appreciated that computing objects 1310, 1326, etc. and computing objects or devices 1302, 1306, 1314, 1316, 1322, etc. can comprise different devices, such as personal digital assistants (PDAs), audio/video devices, mobile phones, MP3 players, personal computers, laptops, etc.

Each computing object 1310, 1326, etc. and computing objects or devices 1302, 1306, 1314, 1316, 1322, etc. can communicate with one or more other computing objects 1310, 1326, etc. and computing objects or devices 1302, 1306, 1314, 1316, 1322, etc. by way of the communications network 1328, either directly or indirectly. Even though illustrated as a single element in FIG. 13, communications network 1328 can comprise other computing objects and computing devices that provide services to the system of FIG. 13, or can represent multiple interconnected networks, which are not shown. Each computing object 1310, 1326, etc. or computing object or device 1302, 1306, 1314, 1316, 1322, etc. can also contain an application, such as applications 1304, 1308, 1312, 1320, 1324, that might make use of an API, or other object, software, firmware or hardware, suitable for communication with or implementation of the shared shopping systems provided in accordance with various non-limiting aspects of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting aspects.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 13, as a non-limiting example, computing objects or devices 1302, 1306, 1314, 1316, 1322, etc. can be thought of as clients and computing objects 1310, 1326, etc. can be thought of as servers where computing objects 1310, 1326, etc., acting as servers provide data services, such as receiving data from client computing objects or devices 1302, 1306, 1314, 1316, 1322, etc., storing of data, processing of data, transmitting data to client computing objects or devices 1302, 1306, 1314, 1316, 1322, etc., although any computer can be considered a client, a server, or both, depending on the circumstances. Any of these computing devices can be processing data, or requesting services or tasks that can implicate the shared shopping techniques as described herein for one or more non-limiting aspects.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1328 or bus is the Internet, for example, the computing objects 1310, 1326, etc. can be Web servers with which other computing objects or devices 1302, 1306, 1314, 1316, 1322, etc. communicate via any of a number of known protocols, such as the hypertext transfer protocol (HTTP). Computing objects 1310, 1312, etc. acting as servers can also serve as clients, e.g., computing objects or devices 1302, 1306, 1314, 1316, 1322, etc., as can be characteristic of a distributed computing environment.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (aspects) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to aspects and examples described herein.

Moreover, various aspects or features described herein can be implemented as a method, apparatus, or article of manufacture using standard programming or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction(s) or data. Additionally, a computer program product can include a computer readable medium having one or more instructions or codes operable to cause a computer to perform functions described herein. It is to be appreciated that the terms "computer-readable storage medium," "storage medium," "computer storage medium," and the like do not encompass transitory media such as propagating signals.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes or actions of a method or algorithm can reside as one or any combination or set of codes or instructions on a machine-readable medium or computer readable medium, which can be incorporated into a computer program product.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A computing system, comprising:

a processor; and memory that stores an aircraft analysis application that, when executed by the processor, cause the computing system to perform acts comprising:

retrieving transponder data from a transceiver configured to receive a signal that is output by an automatic dependent surveillance-broadcast (ADS-B) transponder mounted on an aircraft, wherein the transponder data is indicative of a first portion of location data indicative of locations of the aircraft over a period of time comprising a plurality of flights by the aircraft, wherein the first portion of location data fails to indicate all locations of the aircraft over the period of time;

generating a flight data query based upon the transponder data, wherein the flight data query is configured to identify information relating to the aircraft not indicated by the transponder data;

executing a search based upon the flight data query at least at a first external computing system comprising first format data and a second external computing system comprising second format data;

responsive to executing the search, retrieving flight data indicative of a second portion of location data indicative of locations of the aircraft over the period of time, wherein the second portion of location data fails to indicate all locations of the aircraft over the period of time, wherein the second portion of location data comprises at least one of first format data and second format data;

computing, via flight data inference logic executed by the aircraft analysis application, inferred flight data indicative of a third portion of location data indicative of locations of the aircraft not indicated by the first portion of location data or the second portion of location data;

generating an aggregated location data indicative of the locations of the aircraft indicated by the transponder data, the flight data, and the inferred flight data, wherein generating the aggregated location data further comprises transforming at least one of the first format data or the second format data to an aggregated data format;

mapping locations indicated by the aggregated location data to a jurisdictional map, the jurisdictional map identifying boundaries of a plurality of jurisdictions;

computing a fractional portion of time spent by the aircraft within a first jurisdiction in the plurality of jurisdictions based upon the aggregated location data and the jurisdictional map; and generating a jurisdictional status report that comprises a graphical indication of the fractional portion of time spent by the aircraft in the first jurisdiction.

2. The computing system of claim 1, wherein the jurisdictional status report further comprises graphical indicia of a flight path of the aircraft, the graphical indicia of the flight path being based upon the locations of the aircraft over the period of time indicated by the transponder data and the flight data.

3. The computing system of claim 2, further comprising: causing the graphical indicia of the flight path to be overlaid on a computer-generated image depicting at least a portion of the first jurisdiction.

4. The computing system of claim 2, the acts further comprising:

computing an estimated flight path of the aircraft based upon the locations of the aircraft indicated by the transponder data, wherein the flight path of the aircraft is the estimated flight path.

5. The computing system of claim 1, the acts further comprising:

determining a departure airport and an arrival airport for a flight of the aircraft based upon the locations of the aircraft indicated by the transponder data and an airport map indicative of locations of airports, wherein the jurisdictional status report is indicative of at least one of the departure airport or the arrival airport for the flight of the aircraft.

6. The computing system of claim 5, wherein the computing the fractional portion of time spent by the aircraft in the first jurisdiction is based upon at least one of a time of departure of the flight from the departure airport or a time of arrival of the flight to the arrival airport.

7. The computing system of claim 1, the acts further comprising:

creating a flight table having a plurality of entries based upon the flight data and the plurality of locations indicated by the transponder data, each of the entries in the flight table representative of a respective flight flown by the aircraft; and merging the transponder data with the flight table to create a merged flight table such that each of the entries in the merged flight table comprises locations of the aircraft during the flight represented by that entry.

8. The computing system of claim 7, wherein merging the transponder data with the flight table comprises:

determining, based upon the locations indicated by the transponder data, that the aircraft landed at a first airport at a first time;

determining that a first entry in the flight table is indicative of a first flight for which the aircraft landed at the first airport at the first time;

responsive to determining that the first entry is indicative of the first flight for which the aircraft landed at the first airport at the first time, merging a first portion of the transponder data into the first entry, wherein the first portion of the transponder data comprises locations of the aircraft during the first flight represented by the first entry.

9. The computing system of claim 7, wherein merging the transponder data with the flight table comprises:

determining, based upon times associated with the locations indicated by the transponder data, that the locations indicated by the transponder data are locations of the aircraft during a first flight of the aircraft; and responsive to determining that the locations indicated by the transponder data are locations of the aircraft during the first flight of the aircraft, updating a first entry in the flight table that is representative of the first flight of the aircraft to include the locations indicated by the transponder data.

10. The computing system of claim 1, wherein the fractional portion of time spent by the aircraft in the first jurisdiction identifies a fraction of time spent by the aircraft in the first jurisdiction relative to all other jurisdictions.

11. The computing system of claim 1, wherein the fractional portion of time spent by the aircraft in the first jurisdiction identifies a fraction of time spent by the aircraft in the first jurisdiction relative to other jurisdictions in a same state.

12. The computing system of claim 1, wherein the jurisdictional status report further comprises an image of an operational area of the aircraft, the image including a graphical indication of at least a first portion of the locations of the aircraft during the period of time as indicated by the transponder data, the first portion of the locations including a plurality of locations other than an origin or destination of the aircraft.

13. The computing system of claim 1, further comprising: causing the graphical indication of the fractional portion of time spent by the aircraft in the first jurisdiction to be displayed at a display associated with a client computing device.

14. A method, comprising:

receiving transponder data from a transceiver configured to receive a signal that is output by a plurality of automatic dependent surveillance-broadcast (ADS-B) transponders each mounted on a respective aircraft in a plurality of aircraft, the transponder data indicative of a first portion of location data indicative of locations of the plurality of aircraft over a period of time, wherein the first portion of location data fails to indicate all locations of the plurality of aircraft over the period of time;

generating a flight data query based upon the transponder data, wherein the flight data query is configured to identify information relating to the plurality of aircraft not indicated by the transponder data;

executing a search based upon the flight data query at least at a first external computing system comprising a first format data and a second external computing system comprising a second format data;

responsive to executing the search, retrieving flight data indicative of a second portion of location data indicative of locations of the plurality of aircraft over the period of time, wherein the second portion of location data fails to indicate all locations of the plurality of aircraft over the period of time, wherein the second portion of location data comprises at least one of first format data and second format data;

computing, via flight data inference logic executed by the aircraft analysis application, inferred flight data indicative of a third portion of location data indicative of locations of the aircraft not indicated by the first portion of location data or the second portion of location data;

generating an aggregated location data indicative of the locations of the plurality of aircraft indicated by the transponder data, and the flight data, and the inferred flight data, wherein generating the aggregated location data further comprises transforming at least one of the first format data or the second format data to an aggregated data format;

mapping locations indicated by the aggregated location data to a jurisdictional map, the jurisdictional map indicating boundaries of a plurality of jurisdictions;

computing a fractional portion of time spent in a first jurisdiction in the plurality of jurisdictions by a first aircraft in the plurality of aircraft based upon the locations of the first aircraft based upon the aggregated location data and the jurisdictional map; and outputting a jurisdictional status report that comprises graphical indicia of the fractional portion of time spent by the first aircraft in the first jurisdiction during the period of time.

15. The method of claim 14, further comprising:

computing a respective fractional portion of time spent in the first jurisdiction for each of the plurality of aircraft based upon the aggregated location data and the jurisdictional map, wherein further the jurisdictional status report comprises graphical indicia of the fractional portions of time spent by each of the plurality of aircraft in the first jurisdiction during the period of time.

16. The method of claim 14, further comprising:

computing, for each of the plurality of aircraft and based upon the mapping of the locations of the plurality of aircraft to the jurisdictional map, a confidence score indicative of a likelihood that an aircraft was present in a first jurisdiction for a first period of time.

17. The method of claim 14, further comprising:

determining a base airport of the first aircraft based upon the mapping of the locations to the jurisdictional map, wherein the status report further comprises graphical indicia of the base airport of the first aircraft.

18. The method of claim 14, further comprising:

computing a second fractional portion of time spent by the first aircraft in a second jurisdiction in the plurality of jurisdictions based upon the locations of the first aircraft and the jurisdictional map; and computing an apportionment share of tax liability for the first aircraft due to the first jurisdiction based upon the first fractional portion of time and the second fractional portion of time.

19. The method of claim 14, further comprising:

computing a fractional portion of mileage flown in the first jurisdiction by the first aircraft based upon the locations of the first aircraft indicated by the transponder data and the jurisdictional map; and computing an apportionment share of tax liability for the first aircraft due to the first jurisdiction based upon the fractional portion of mileage flown in the first jurisdiction by the first aircraft.

20. The method of claim 19, wherein computing the fractional portion of mileage flown in the first jurisdiction comprises:

computing an estimated flight path of the first aircraft based upon the locations of the first aircraft indicated by the transponder data and the jurisdictional map; and computing the fractional portion of mileage flown based upon the estimated flight path.

21. A system comprising:

a transceiver configured to receive transponder signals output by a transponder affixed to an aircraft from a plurality of aircraft and to output transponder data indicative of a first portion of location data indicative of locations of the plurality of aircraft and at least one of an altitude or velocity, wherein the first portion of location data fails to indicate all locations of at least one aircraft of the plurality of aircraft; and a computing device programmed with computer-executable instructions such that the computing device performs acts comprising:

receiving the transponder data from the transceiver;

generating a flight data query based upon the transponder data, wherein the flight data query is configured to identify information relating to the at least one aircraft not indicated by the transponder data;

executing a search based upon the flight data query at least at a first external computing system;

responsive to executing the search, retrieving flight data indicative of a second portion of location data indicative of locations of the plurality of aircraft over a period of time, wherein the second portion of location data fails to indicate all locations of the at least one aircraft;

generating, via flight data inference logic executed by the computing device, inferred flight data indicative of a third portion of location data indicative of locations of the at least one aircraft not indicated by the first portion of location data or the second portion of location data;

generating an aggregated location data indicative of the locations of the aircraft indicated by the transponder data, the flight data, and the inferred flight data, wherein generating the aggregated location data further comprises transforming at least one of the transponder data or the flight data to an aggregated data format;

mapping locations indicated by the aggregated location to a jurisdictional map, the jurisdictional map identifying boundaries of a plurality of jurisdictions;

computing at least one of a fractional portion of time spent or mileage flown by the aircraft in a first jurisdiction in the plurality of jurisdictions based upon the aggregated location data and the jurisdictional map; and generating a status report that comprises a graphical indication of the at least one of the fractional portion of time spent by the aircraft in the first jurisdiction or the fractional portion of mileage flown in the first jurisdiction.

22. A computing system, comprising:

a processor; and memory that stores an aircraft analysis application that, when executed by the processor, cause the computing system to perform acts comprising:

retrieving a first aircraft status data for an aircraft, wherein the first aircraft status data is indicative of the status of the aircraft over a period of time comprising a plurality of flights by the aircraft, wherein the first aircraft status data fails to indicate all locations of the aircraft over the period of time, wherein the first aircraft status data comprises at least one of i) transponder data indicative of locations of the aircraft based on data that is output by a transponder mounted on the aircraft, ii) flight data indicative of air traffic control tracking of the aircraft, or iii) transponder data and flight data;

generating a query based upon the first aircraft status data, wherein the query is configured to identify information relating to the aircraft not indicated by the first aircraft status data;

executing a search based upon the query at a first external computing system comprising first format data and a second external computing system comprising second format data;

responsive to executing the search, retrieving a second aircraft status data, wherein the second aircraft status data is indicative of the status of the aircraft over the period of time, wherein the second aircraft status data fails to indicate all locations of the aircraft over the period of time, wherein the second aircraft status data comprises at least one of i) transponder data indicative of locations of the aircraft based on data that is output by the transponder mounted on the aircraft, ii) flight data indicative of air traffic control tracking of the aircraft, or iii) transponder data and flight data;

computing, via flight data inference logic executed by the aircraft analysis application, inferred flight data indicative of a third aircraft status data, wherein the third aircraft status data is indicative of locations of the aircraft not indicated by the first aircraft status data or the second aircraft status data;

generating an aggregated aircraft status data indicative of the locations of the aircraft indicated by the first aircraft status data, the second aircraft status data, and the third aircraft status data, wherein generating the aggregated aircraft status data further comprises transforming at least one of the first format data or the second format data to an aggregated data format;

mapping the locations of the aircraft indicated by the aggregated aircraft status data to a jurisdictional map, the jurisdictional map identifying boundaries of a plurality of jurisdictions;

computing a fractional portion of time spent by the first aircraft in a first jurisdiction in the plurality of jurisdictions based upon the locations of the aircraft indicated by the aggregated aircraft status data and the jurisdictional map; and generating a jurisdictional status report that comprises a graphical indication of the fractional portion of time spent by the aircraft in the first jurisdiction.

23. The computing system of claim 22, wherein the transponder data comprises at least one of automatic dependent surveillance-broadcast (ADS-B) transponder data, mode S transponder data, or mode C transponder data.

24. The computing system of claim 23, wherein the jurisdictional status report further comprises graphical indicia of a flight path of the aircraft, wherein the graphical indicia of the flight path is based upon an estimated flight path computed by the aircraft analysis application.

25. The computing system of claim 24, further comprising: causing the graphical indicia of the flight path to be overlaid on computer-generated image depicting at least a portion of the first jurisdiction.

26. The computing system of claim 25, the acts further comprising:

determining a departure airport and an arrival airport for a flight of the aircraft based upon the locations of the aircraft indicated by the aircraft status data and an airport map indicative of locations of airports, wherein the jurisdictional status report is indicative of at least one of a departure airport or an arrival airport for the flight of the aircraft.

27. The computing system of claim 22, the acts further comprising:

creating a flight table having a plurality of entries based upon the aircraft status data, wherein each of the entries in the flight table are representative of a respective flight flown by the aircraft.

28. The computing system of claim 27, the acts further comprising:

calculating, based upon the jurisdictional status report, a confidence score indicative of a confidence that the aircraft was present in a certain jurisdiction for a certain period of time.

29. The computing system of claim 28, the acts further comprising:

determining that the calculated confidence score is below a confidence threshold, wherein a confidence score below the confidence threshold is indicative of a gap in the flight table;

retrieving supplementary aircraft status data;

merging the aircraft status data with the supplementary aircraft status data to create merged aircraft status data;

calculating a modified flight table based on the merged aircraft status data.

30. The computing system of claim 29, generating an updated jurisdictional status report based on the modified flight table.

* * * * *